Oct. 14, 1958  H. P. LUHN  2,856,052
IMPRESSION ADJUSTER FOR TYPEWRITERS
Filed Dec. 30, 1954  21 Sheets-Sheet 1

INVENTOR
Hans P. Luhn
BY
ATTORNEY

INVENTOR
Hans P. Luhn
BY
ATTORNEY

INVENTOR
Hans P. Luhn
BY
ATTORNEY

Oct. 14, 1958   H. P. LUHN   2,856,052
IMPRESSION ADJUSTER FOR TYPEWRITERS
Filed Dec. 30, 1954   21 Sheets-Sheet 5

INVENTOR
Hans P. Luhn
BY
ATTORNEY

Oct. 14, 1958 H. P. LUHN 2,856,052
IMPRESSION ADJUSTER FOR TYPEWRITERS
Filed Dec. 30, 1954 21 Sheets-Sheet 6

INVENTOR
Hans P. Luhn
BY
ATTORNEY

Oct. 14, 1958        H. P. LUHN        2,856,052

IMPRESSION ADJUSTER FOR TYPEWRITERS

Filed Dec. 30, 1954        21 Sheets-Sheet 7

INVENTOR
Hans P. Luhn

BY

ATTORNEY

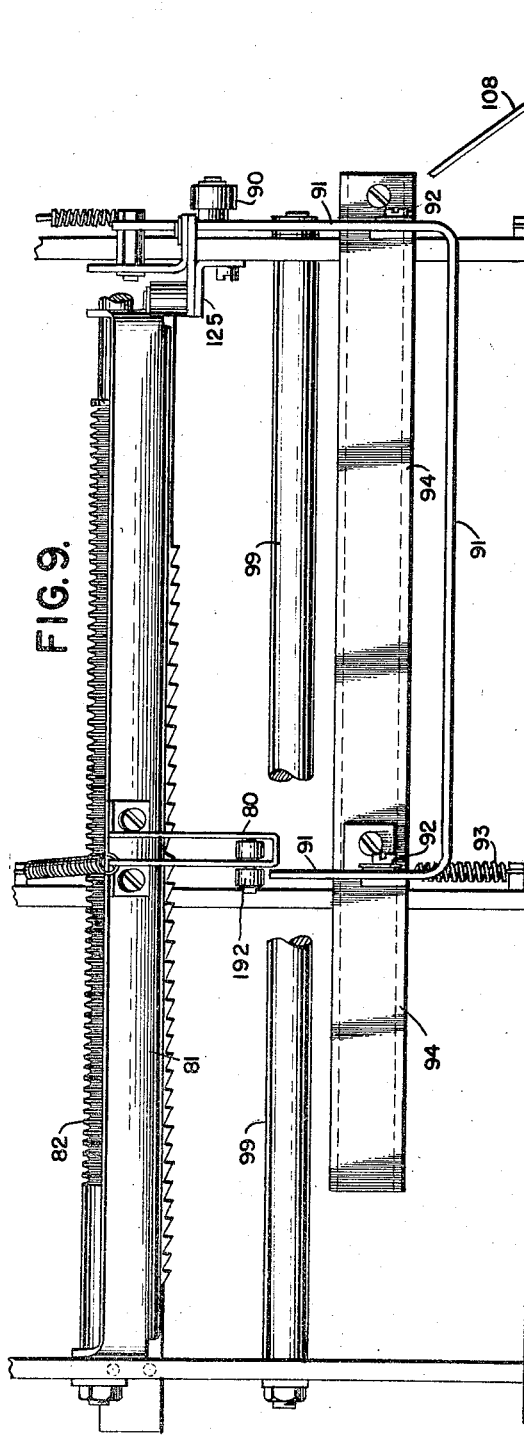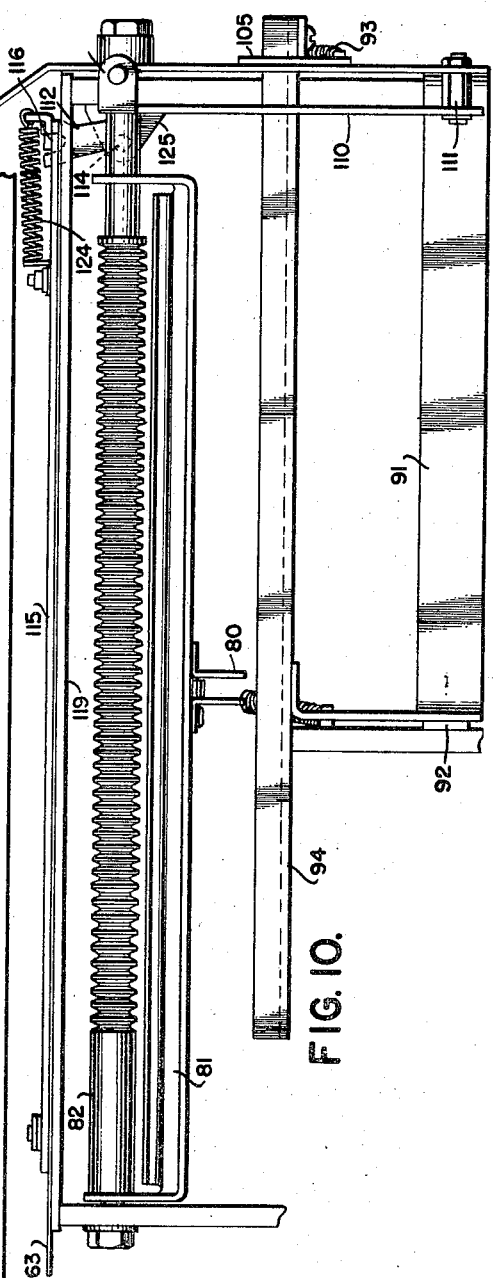

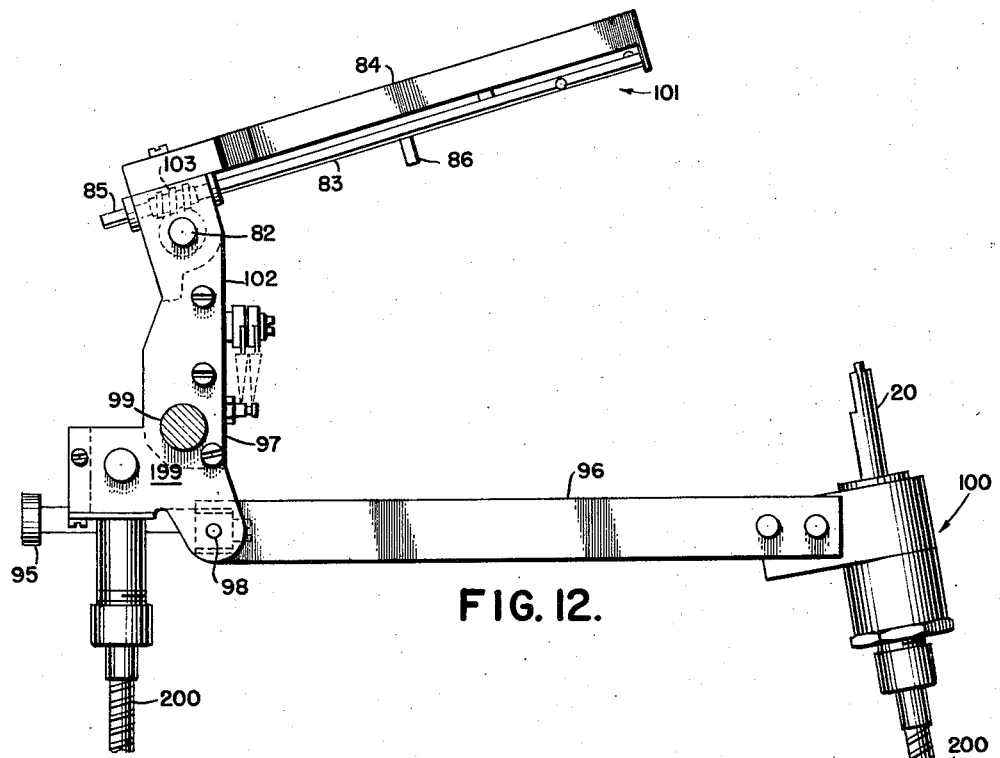
FIG. 12.
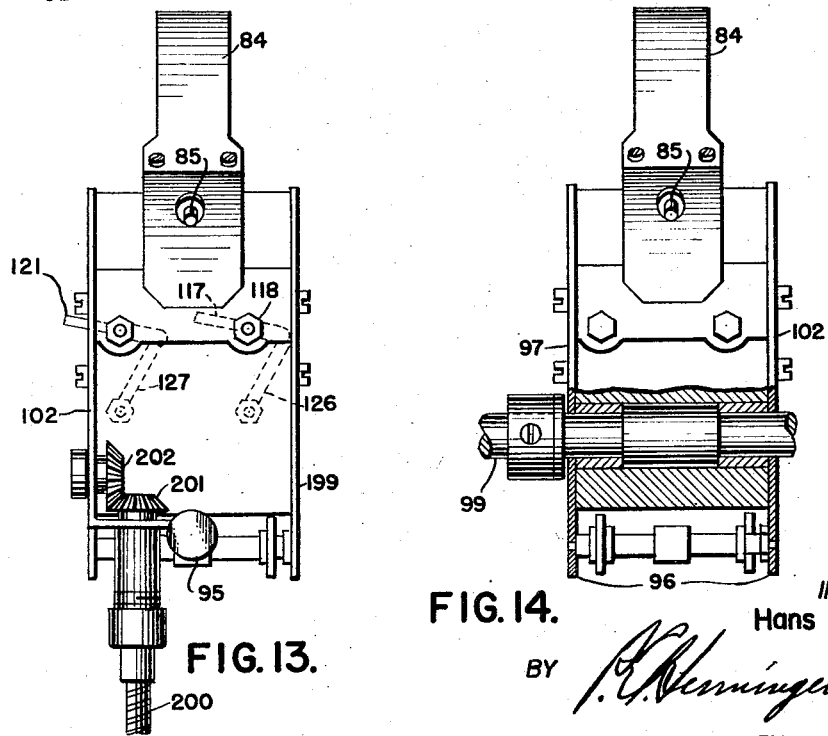
FIG. 13.
FIG. 14.
INVENTOR
Hans P. Luhn
BY
ATTORNEY Oct. 14, 1958 H. P. LUHN 2,856,052
IMPRESSION ADJUSTER FOR TYPEWRITERS
Filed Dec. 30, 1954 21 Sheets-Sheet 11

INVENTOR
Hans P. Luhn

ATTORNEY

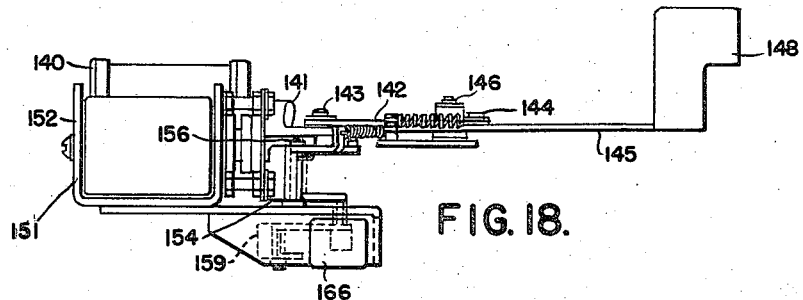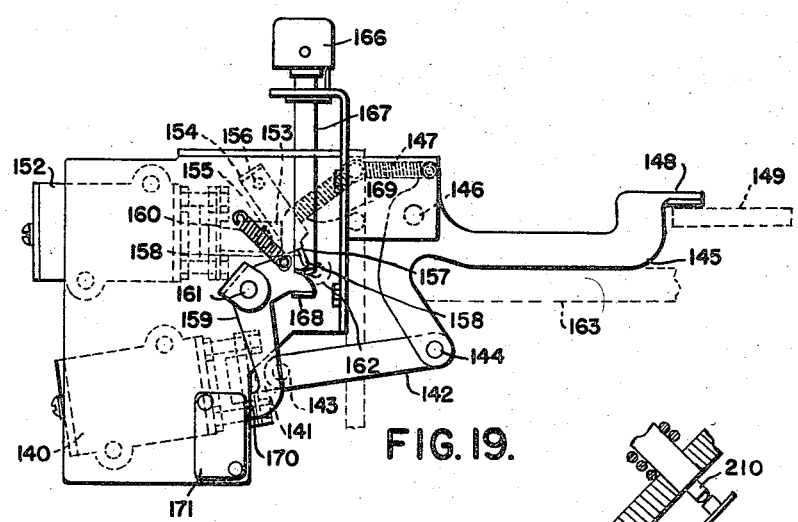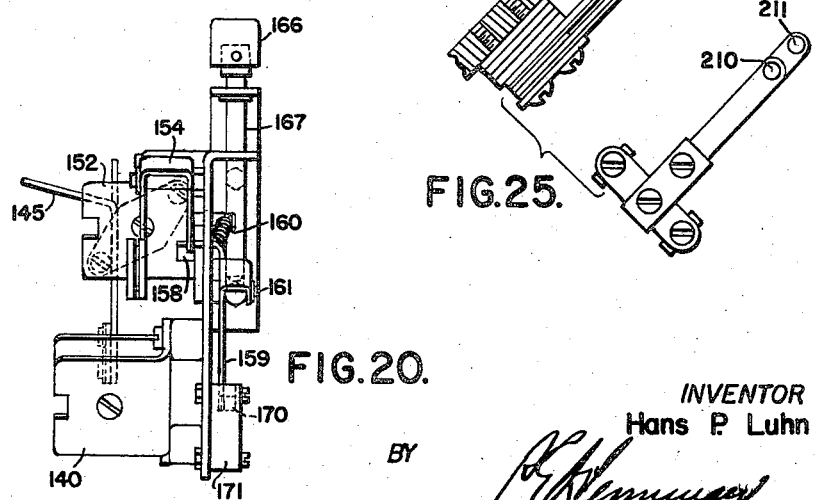

Oct. 14, 1958          H. P. LUHN          2,856,052

IMPRESSION ADJUSTER FOR TYPEWRITERS

Filed Dec. 30, 1954          21 Sheets-Sheet 13

INVENTOR
Hans P. Luhn
BY
ATTORNEY

Oct. 14, 1958  H. P. LUHN  2,856,052
IMPRESSION ADJUSTER FOR TYPEWRITERS
Filed Dec. 30, 1954  21 Sheets-Sheet 14
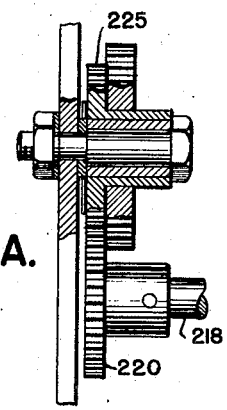
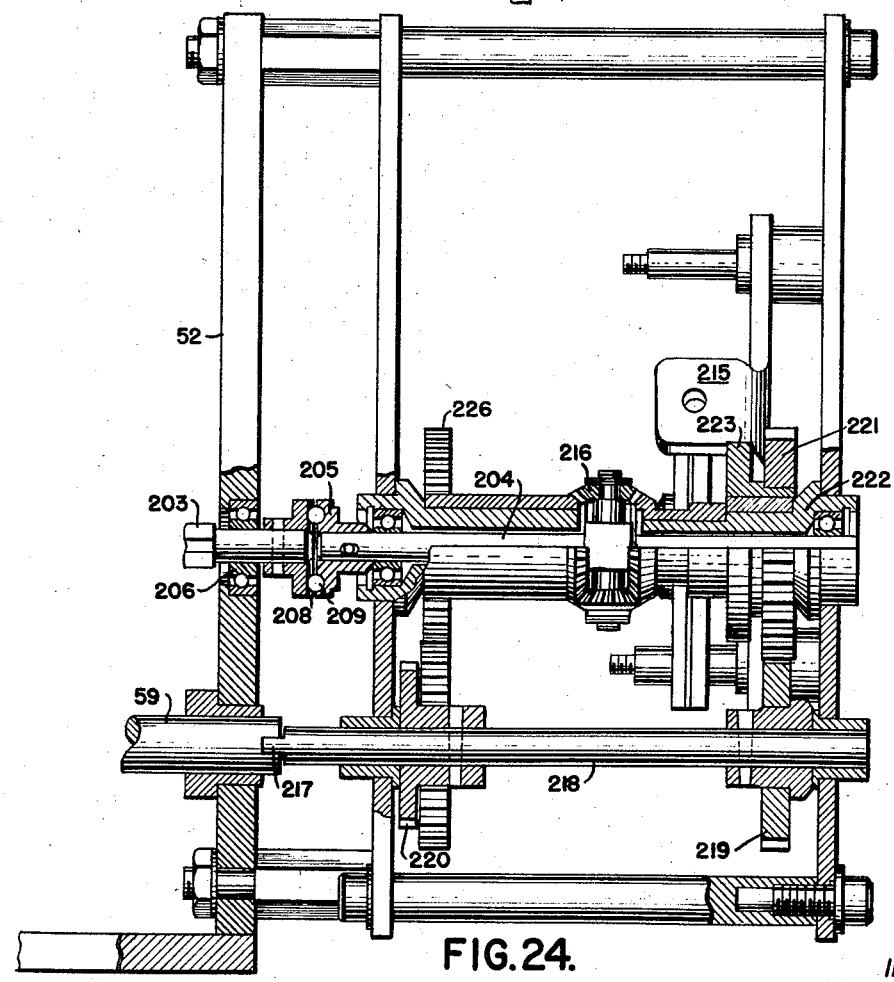
INVENTOR
Hans P. Luhn
BY
ATTORNEY Oct. 14, 1958 — H. P. LUHN — 2,856,052
IMPRESSION ADJUSTER FOR TYPEWRITERS
Filed Dec. 30, 1954 — 21 Sheets-Sheet 17

INVENTOR
Hans P. Luhn
BY
ATTORNEY

Oct. 14, 1958     H. P. LUHN     2,856,052
IMPRESSION ADJUSTER FOR TYPEWRITERS

Filed Dec. 30, 1954     21 Sheets-Sheet 18

INVENTOR
Hans P. Luhn
BY
ATTORNEY

Oct. 14, 1958   H. P. LUHN   2,856,052
IMPRESSION ADJUSTER FOR TYPEWRITERS
Filed Dec. 30, 1954   21 Sheets-Sheet 19

INVENTOR
Hans P. Luhn
BY
ATTORNEY

Oct. 14, 1958 H. P. LUHN 2,856,052
IMPRESSION ADJUSTER FOR TYPEWRITERS
Filed Dec. 30, 1954 21 Sheets-Sheet 20

INVENTOR
Hans P. Luhn
ATTORNEY

Oct. 14, 1958 H. P. LUHN 2,856,052
IMPRESSION ADJUSTER FOR TYPEWRITERS
Filed Dec. 30, 1954 21 Sheets-Sheet 21

INVENTOR
Hans P. Luhn
BY
ATTORNEY

United States Patent Office 2,856,052
Patented Oct. 14, 1958

2,856,052

IMPRESSION ADJUSTER FOR TYPEWRITERS

Hans P. Luhn, Armonk, N. Y., assignor to International Business Machines Corporation, New York, N. Y., a corporation of New York Application December 30, 1954, Serial No. 478,715

13 Claims. (Cl. 197—17)

This invention relates to adjustment systems and more particularly to a method and apparatus for automatic type bar impression adjustment for electrically operated typewriters.

In the manufacture, assembly and testing of electrical, mechanical and electromechanical devices, problems often arise relative to the adjustment and setting of a given factor or element which is a function of a number of variables having non-uniform characteristics. Conventional practice usually dictates that such adjustment or setting be manually effected, usually by hit or miss methods. Such manual adjustment is at best normally time-consuming and of somewhat doubtful accuracy in that it requires individual adjustment in response to visual estimation.

A problem such as set forth above is encountered in the adjustment of the type bar impression density subsequent to the manufacture and assembly of electrically actuatable typewriters. The density of type impression in electrically actuatable typewriters is a function of the force with which a type bar impinges on the platen of a typewriter. This force in turn depends upon a number of variables such as the speed of the typewriter power roll, the duration of engagement with the power roll, the friction within the bearings of the linkage of the type bar mechanism, the weight of the type head, and others. Because of the relatively large number of variables, a change in any one will effect a change in type impression. Heretofore, impression adjustment to obtain comparative similar density of type impression has been manually effected at or near the final check of the unit prior to shipment. The manual adjustment at best is time-consuming and of somewhat doubtful accuracy in that it requires individual adjustment in response to a visual estimate of impression density covering the entire keyboard. The adjustment is effected by rotation of the so-called cam knock-off screws, the ends of which act as stops for an element of the type bar mechanism and is determinative of the duration of the engagement of the type bar assembly with the power roll.

Because of the nature and number of the variables involved, there is no fixed or predeterminable relationship between the setting of the cam knock-off screw and the desired impression density. The resultant change in impression density per increment of knock-off screw turn is an unpredictable and erratic function which not only differs between the individual keys of a given typewriter, but also between identical keys of different typewriters. This situation precludes automatic adjustment based upon the magnitude of the difference between a measured setting and a desired setting and also an adjustment based upon a trial and error method which may result in endless hunting.

In its broad aspects this invention relates to an adjustment method adapted for use in systems wherein the value of a factor to be adjusted or set is a function of $n$ variables and has certain predetermined maximum and minimum values. In general it includes the steps of locating the value of the factor relative to the predetermined desired value thereof disposed within the maximum and minimum limits for said factor and then varying at least one of the $n$ variables in a predetermined manner as to the amount of variation and/or number of variations so as to continuously decrease the difference between the observed value of the factor and the predetermined desired value. The amount of variation in the selected variable is preferably determined in accordance with a decreasing progression such as, for example, a binary progression 8-4-2-1. However in general any decreasing progression of the type wherein the sum of the terms following the first equals or closely approximates the value of the first term may be employed to effect desired adjustment within predetermined tolerance limits. In its narrower aspects the invention is disclosed in conjunction with an automatic impression adjustment mechanism employing a binary bracketing system in which a measured speed of a type bar is sequentially compared with a desired speed, and the direction of the difference therebetween is utilized to effect sequential adjustments in accordance with a binary progression in such a manner as to change the direction of said difference.

The object of this invention is the provision of an improved adjustment system.

Another object of this invention is the provision of an automatic type bar impression adjusting mechanism incorporating said adjustment system.

Other objects and advantages of the invention will be pointed out in the following disclosure and claims and will be illustrated in the accompanying drawings which disclose by way of example the principles of the invention and the presently preferred embodiment of an automatic impression adjusting machine incorporating those principles.

Referring to the drawings:

Fig. 5 is a plan view of the apparatus illustrated in Fig. 4;

Fig. 9 is a front elevational view of the feed rack and escapement assembly;

Fig. 10 is a plan view of the feed rack and escapement assembly;

Fig. 12 is a side elevational view of the carriage and operating arm assembly;

Fig. 13 is a front elevation of the carriage and operating arm assembly;

Fig. 14 is a partial sectional view on the line A—A of Fig. 12;

Fig. 18 is a plan view of the key trip space bar and pawl latch release assembly;

Fig. 19 is a front elevational view of the key trip space bar and pawl latch release assembly;

Fig. 20 is a side elevational view of the key trip space bar and pawl latch release assembly;

Fig. 24 is a sectional view of the clutch assembly;

Fig. 24A is a sectional view of a detail of the clutch assembly;

Figure 28:
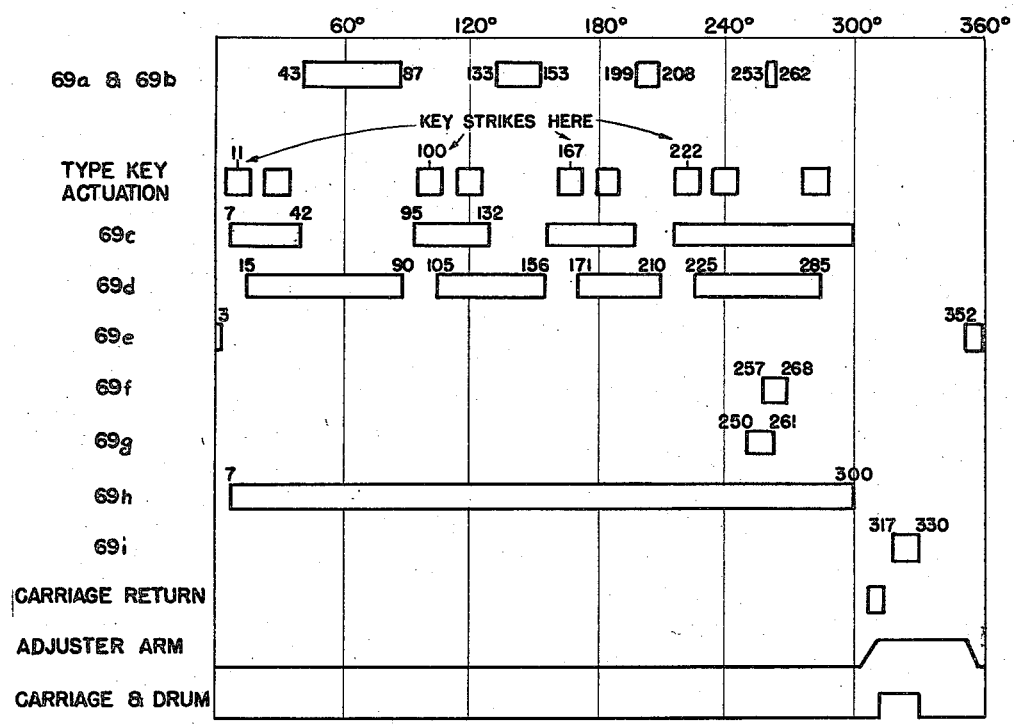
Figure 26:
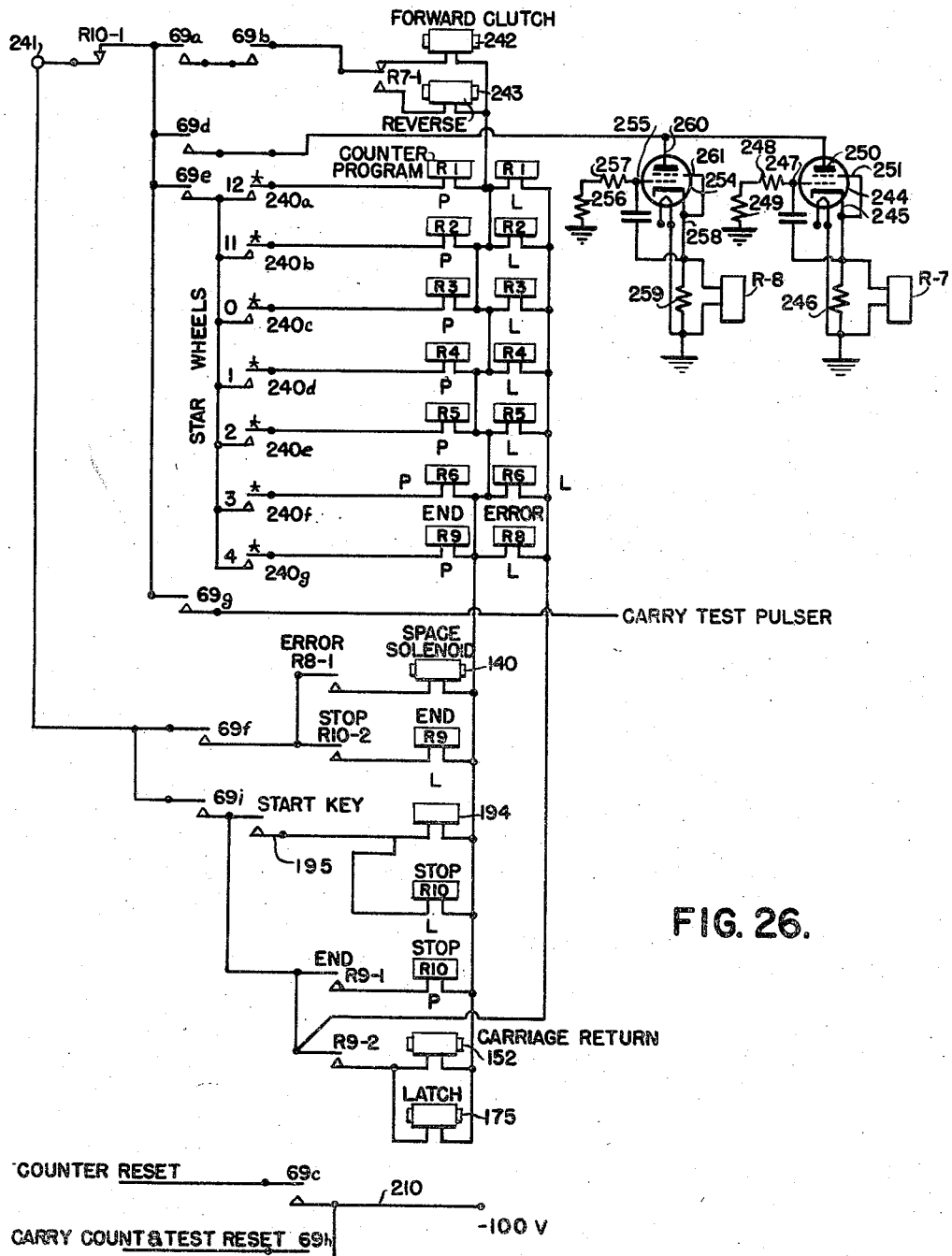
Figure 27:
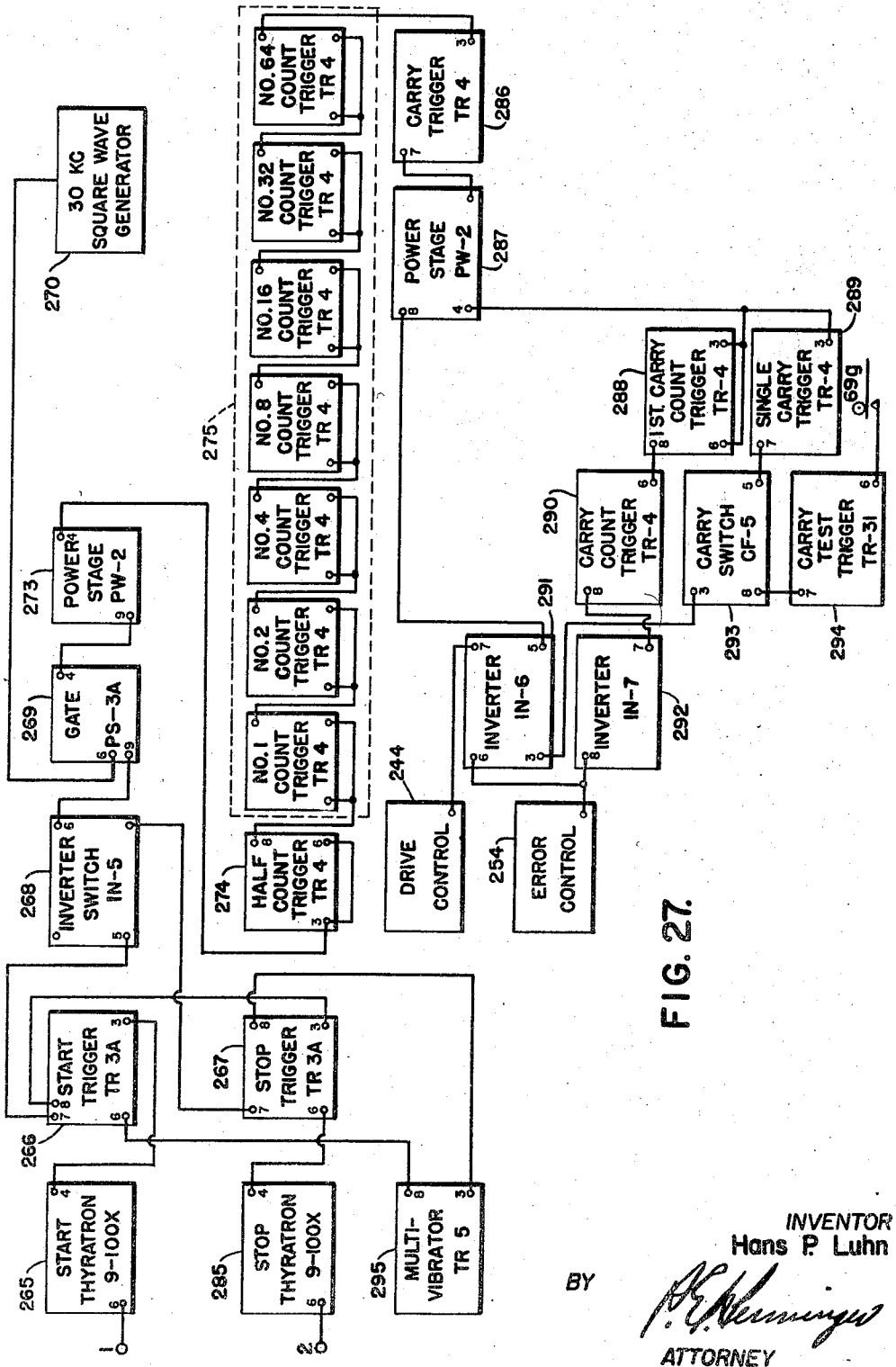
Figure 29A:
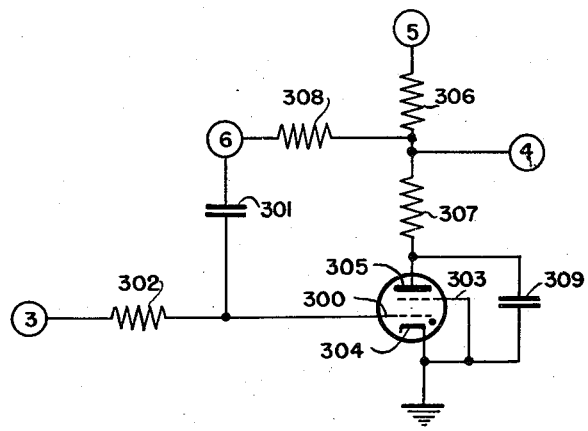
Figure 29B:
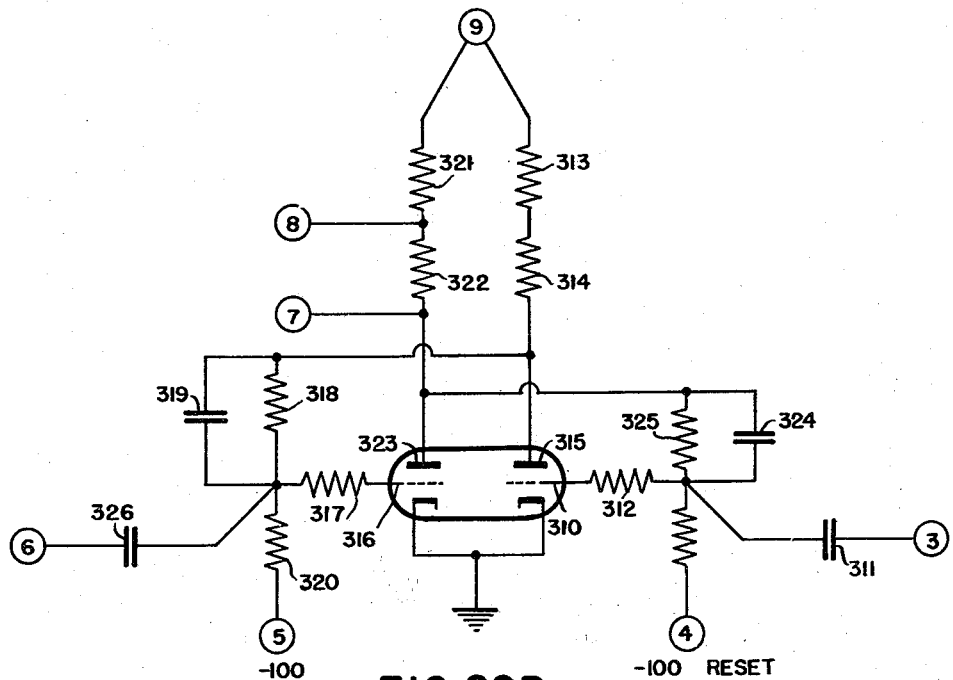
Figure 29C:
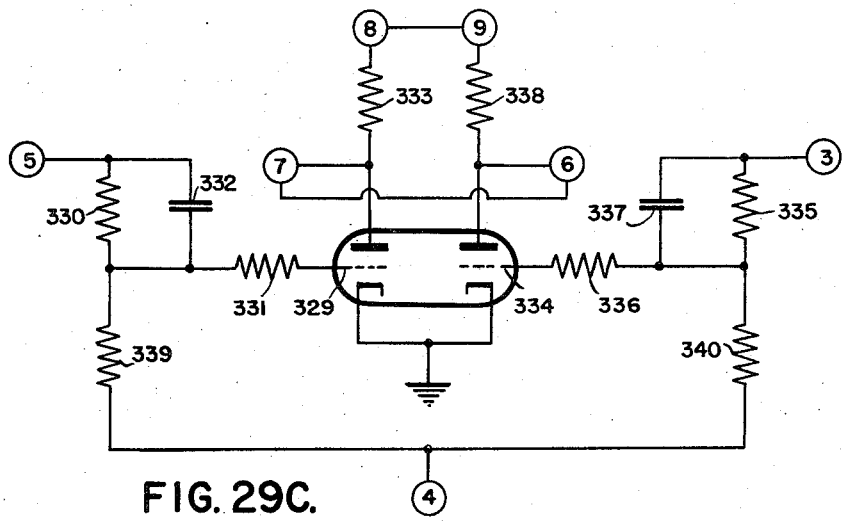
Figure 29D:
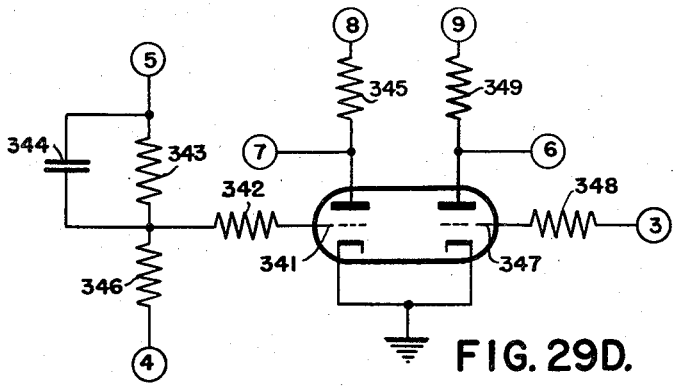
Figure 29E:
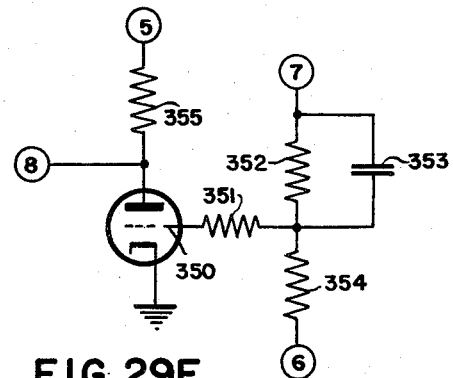
Figure 29F:
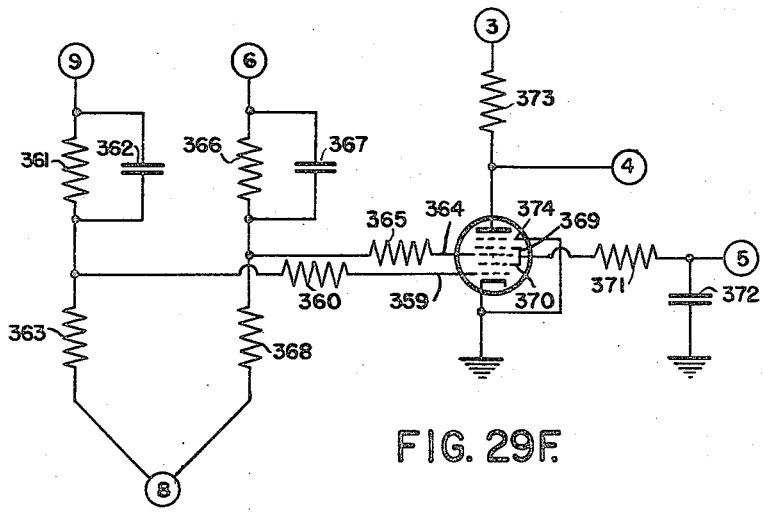
Figure 29G:
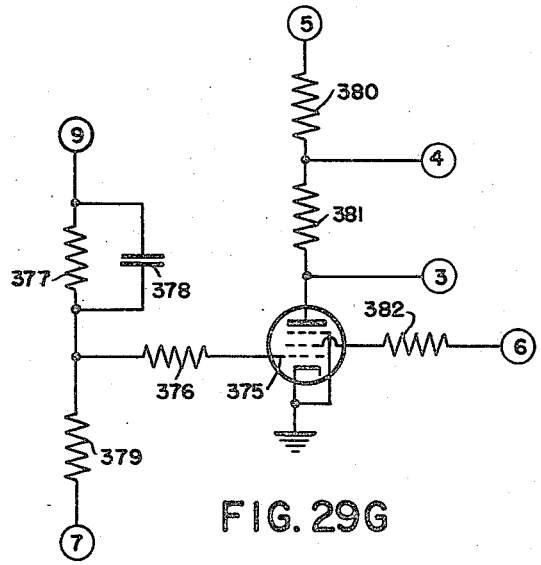
Figure 29H:
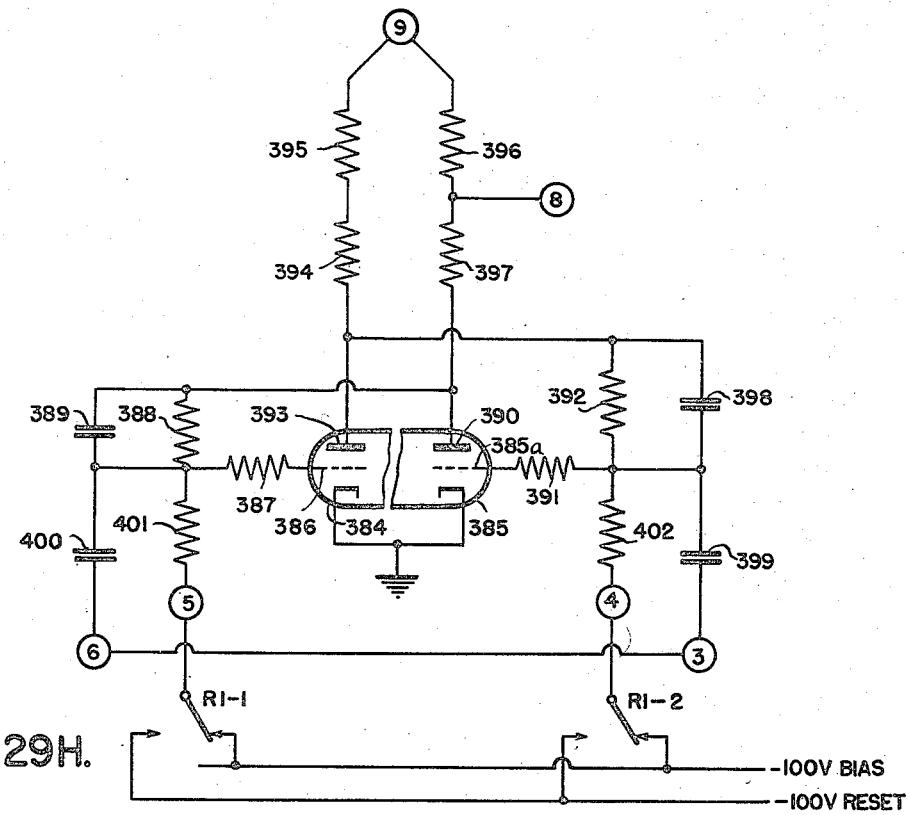
Figure 29I:
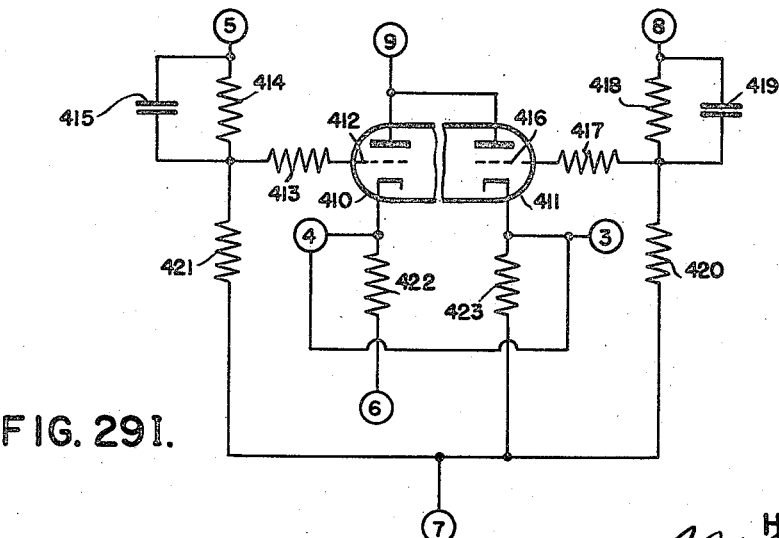
Figure 29J:
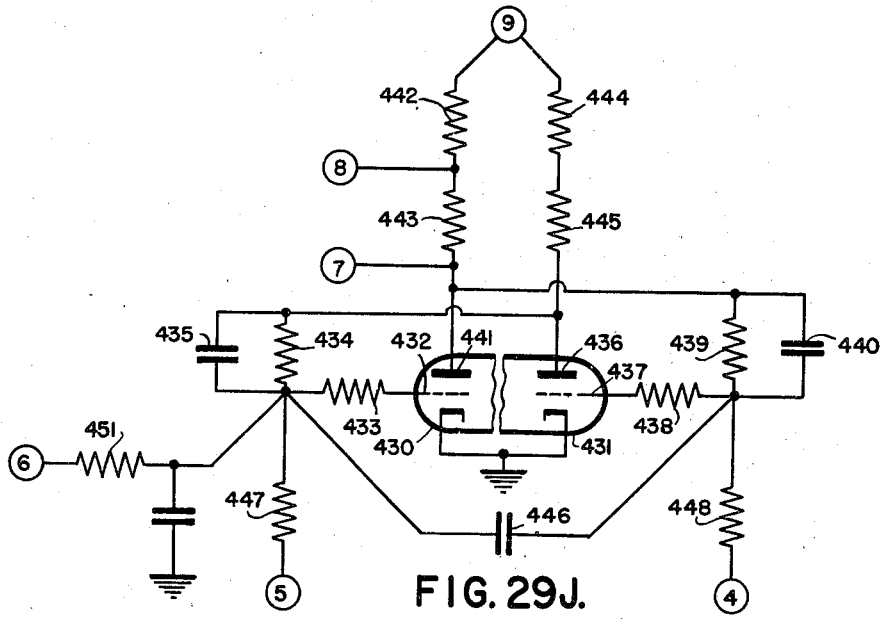

Fig. 25 comprises detail views of the overload relief contact assembly;

Fig. 26 is a schematic diagram of the control circuits;

Fig. 27 is a schematic block diagram of certain of the electrical components;

Fig. 28 is a timing chart of the cam operated contacts;

Fig. 29A is a circuit diagram of the 9–100X start and stop thyratrons;

Fig. 29B is a circuit diagram of the TR–3A start and stop triggers;

Fig. 29C is a circuit diagram of the IN–5 inverter switch;

Fig. 29D is a circuit diagram of the IN–6 inverter switch;

Fig. 29E is a circuit diagram of the IN–7 inverter switch;

Fig. 29F is a circuit diagram of the PS–3A gate;

Fig. 29G is a circuit diagram of the PW–2 power stage;

Fig. 29H is a circuit diagram of the TR–4 trigger;

Fig. 29I is a circuit diagram of the CF–5 carry switch;

Fig. 29J is a circuit diagram of the TR–31 carry test trigger; and

Figure 29K:
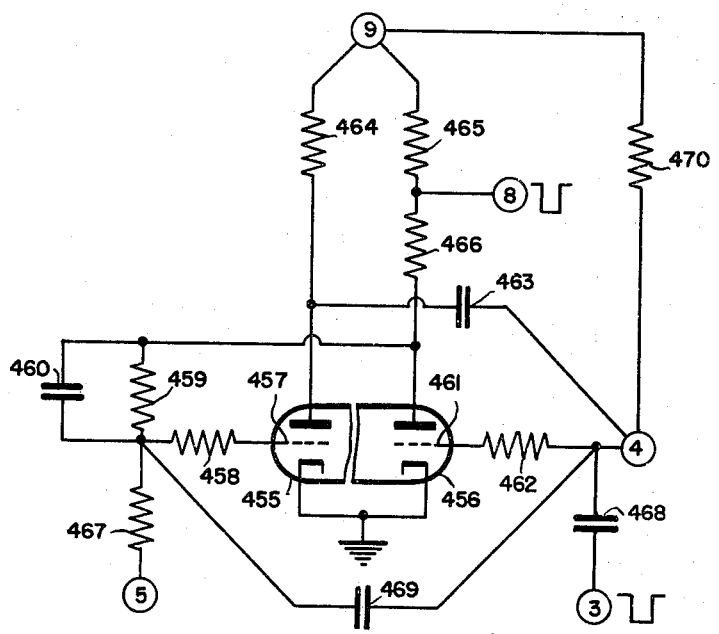

Fig. 29K is a circuit diagram of the TR–5 multivibrator.

*Brief statement of functional operation*

In order that the more detailed description of the nature and operation of the automatic impression adjusting mechanism may be more readily understood, it is believed that a brief preliminary statement as to its construction and operation, without reference to details, may be helpful.

In general, the typewriter impression adjustment device to be described herein is an electromechanical unit and may conveniently be considered as generally including (*a*) the electrical components and (*b*) the mechanical components. The electrical components serve to measure the speed of a type bar being tested and to compare that measured speed with a predetermined speed that is representative of a desired impression density. After comparison the electrical components transmit a suitable actuating signal responsive to the direction of the difference between the measured and desired speeds to the mechanical components, which effect a selective mechanical binarily progressive adjustment of the knock-off cam adjusting screw for the type bar being tested. The mechanical components generally include a type key depression assembly as well as the can knock-off screw adjustment assembly referred to above.

Figure 1:
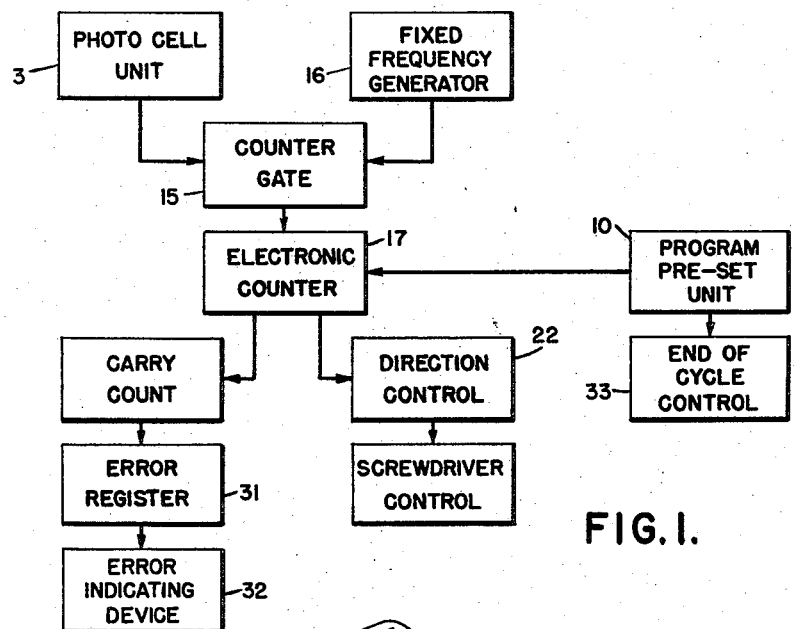
Fig. 1 is a schematic block diagram illustrative of the major electrical components of the invention.
Figure 2:
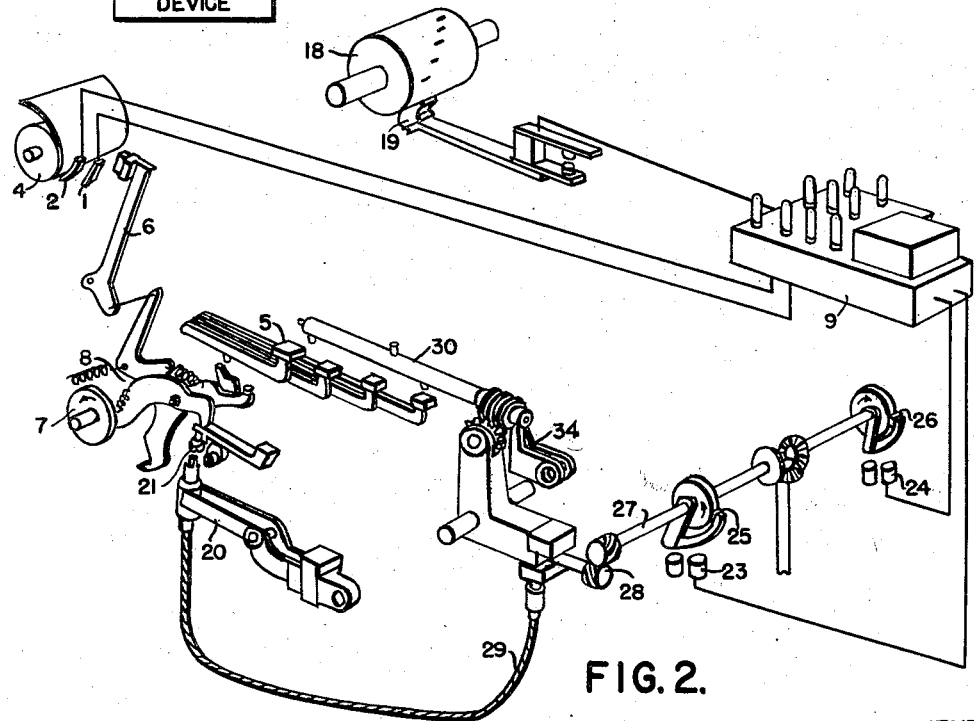
Fig. 2 is a simplified schematic representation of the essentials of the major mechanical components of the invention.
Figure 3:
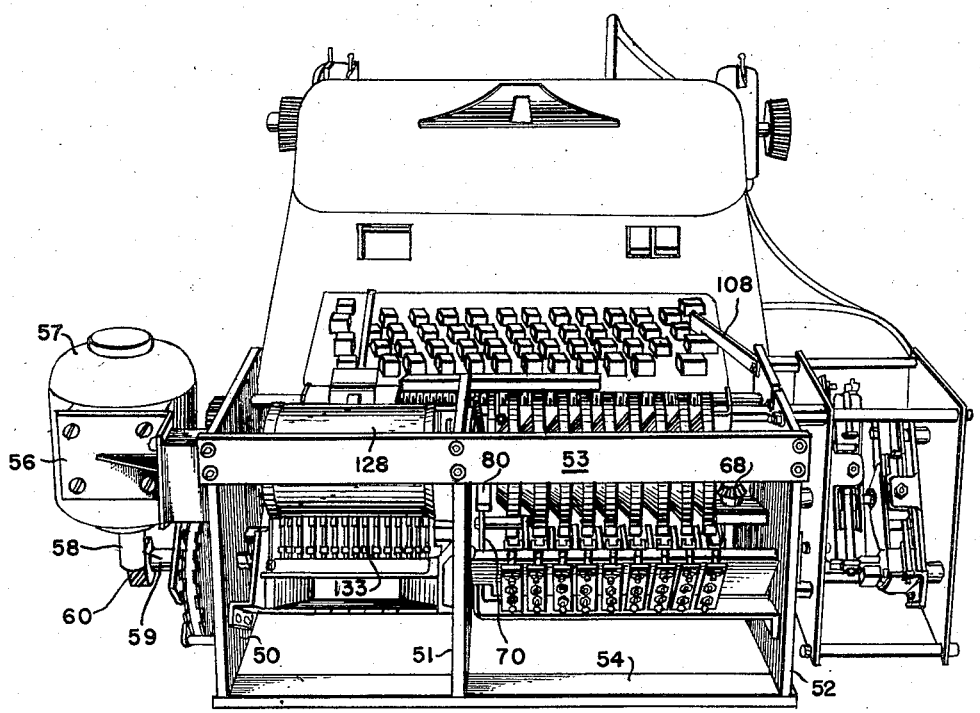
Fig. 3 is a schematic front elevational view of the entire unit positioned in operative relationship with an electric typewriter being adjusted.

Referring to Figs. 1 and 2, the speed of the type bars is measured by a type bar speed sensing unit 3 which is insertable into the typewriter being adjusted adjacent the platen 4 thereof and includes a pair of photocells 1 and 2 spaced a suitable distance apart, for example about one-half inch. When one of the typewriter keys 5 is depressed, the related type bar 6 is conventionally displaced through the action of a typewriter power roll 7 and an associated cam and link mechanism, generally designated 8, past the photocells 1 and 2. The passage of the actuated type bar 6 past the first photocell 1 causes the same to emit an electrical signal. This signal is transmitted to an electronic comparison counter unit generally designated 9 and therein actuates a counter gate 15 which permits entry of pulses of a predetermined frequency, obtained from a fixed frequency generator 16, into a binary counting unit 17 which has been preset by a suitably punched program card 18 through an associated sensing device 19 and relay system, generally designated 10 on Fig. 1. The signal resulting from passage of the type bar 6 past the second photocell 2 serves as a stop signal and interrupts the entry of the fixed frequency pulses into the counter. Thus the speed of the type bar 6 past the photocells 1 and 2 is measured in terms of the number of fixed frequency pulses enterable into the binary counter 17.

In the illustrated embodiment the binary counter 17 is electronic in nature and has, for example, a capacity of 127 and operates on a 30 kc. pulse. The 128th count records a carry which serves to perform a directional control function relative to the cam knock-off screw adjustment assembly 20 utilized to adjust the cam knock-off adjustment screw 21 associated with the tested type bar for impression adjustment thereof. An additional binary count stage is also preferably employed preceding the main counting unit in order to accommodate for minor fluctuations in type bar speed at any given setting. A series of two strokes of the type bar is preferably made for each discrete adjustment and the average of the two readings is used to determine the setting of that particular adjusting screw.

The desired impression standard is set up on a program card 18 which is punched with a six bit binary code with one column for each type bar. The number represented by the punching in the card is the 128's complement of a number representative of the desired setting for the type bars. For example, if the number representing the desired setting happens to be 80, the counter would be preset to the 128's complement thereof, or 48. If, in this case, the speed of the type bar undergoing adjustment was such as to permit 80 or more counts to enter the counting unit 17, a carry would be indicated and the direction control unit 22 would transmit a direction control signal to the proper one of the direction clutch magnets 23 and 24 to initiate an adjustment of the cam knock-off screw for the type bar. The direction clutch magnets 23 and 24 actuate suitable clutches 25 and 26, respectively, which control the direction of rotation of a drive shaft 27 which, through suitable gearing 28 and a flexible drive shaft 29, controls the direction of rotation of the adjustment screw driver 20.

Each type bar is preferably adjusted in four discrete steps. The cam knock-off screw rotation is based upon a progressive binary adjustment of 8-4-2-1 which is, in the illustrated embodiment, set up to be equivalent to 2-1-½-¼ turns of the cam knock-off adjustment screw 21. The type key actuating shaft 30 is set up to make a series of four double strokes on each typewriter key and a final single stroke which represents the correctly adjusted impression density.

Included in the mechanical components of the device is an automatic adjustment carriage assembly which includes a supporting slide and circular rack on which are mounted the cam knock-off screw adjustment assembly and the type key depression assembly. Both of these units are arranged and adapted to be automatically displaced a predetermined amount transversely to the typewriter keyboard after performing a predetermined series of operations on a given typewriter key and associated cam knock-off screw so as to be in proper position to perform the necessary operations on the next key and adjustment screw. In such a manner the impression adjustment device as described herein will sequentially and automatically perform the necessary testing and adjustment on each of the type bars commencing at the extreme left hand side of the keyboard and finishing on the extreme right hand side thereof.

Also included are an error register 31 and an error indication device 32. These are provided so that if an error in adjustment is recognized, the space bar of the typewriter will be actuated between the last double stroke and the final single stroke of the type bar undergoing adjustment. An error, as represented by a space on the test sheet, signifies that the cam knock-off screw adjustment has not been completed satisfactorily in that the binary counter 17 has not recognized a satisfactory bracketing of the desired value for the particular type bar being tested or perhaps that some mechanical defect, such as a jammed screw, has interfered with normal operation of the adjustment mechanism.

At the completion of a single key adjustment cycle, as described above, the typewriter carriage return key is automatically operated through a cycle control unit 33 to reposition the typewriter carriage for the next strike up impression of the next type bar. Coincidentally therewith, a type key actuating shaft 30, through a suitable escapement mechanism, generally designated at 34, is automatically advanced to the next key position, the cam knock-off screw screwdriver assembly 20 is advanced to the next knock-off adjustment screw 21 through a suitable mechanical linkage system and the program unit 10 is advanced to read the next column of programming.

When a typewriter undergoing adjustment has been completed, a signal from the program unit 10 serves to latch the drive and type key actuation shaft 30 and additionally actuates the adjustment carriage assembly return mechanism to return the adjusting carriage mechanism to the extreme left side of the device. This completes the full adjustment cycle. The typewriter may then be removed and a new one placed in the holding fixture for adjustment.

As a matter of convenience, in the following detailed description of the structure and mode of operation the mechanical components will be considered first and will be followed by the details of the electrical components.

MECHANICAL COMPONENTS

Drive system

Referring particularly to Figs. 3 through 7, there are provided three vertically disposed mounting frame members 50, 51 and 52 maintained in spaced relationship by a front cross brace 53 and a pair of bottom cross braces 54 and 55 secured thereto. Vertically mounted on a suitable bracket 56 adjacent the exterior side of frame member 50 is a drive motor 57. The shaft 58 of the motor 57 drives a horizontally disposed shaft 59 through suitable gearing 60. The shaft 59 is supported adjacent the gearing 60 by a bracket 61 mounted on the exterior side of frame member 50 and at its other extremity by the vertically disposed frame 52. Mounted on the shaft 59 adjacent the frame 52 is a screw 62 which engages with a worm gear 63 mounted on a vertically disposed shaft 64. The vertical shaft 64 is spaced from the frame member 52 and mounted in suitable brackets 65 and 66. The vertically disposed shaft 64 drives a horizontally disposed control cam shaft 67 positioned intermediate the vertical frame members 51 and 52 through suitable bevel bearing 68.

Referring now also to Figs. 8 and 8A through 8C, mounted on the cam shaft 67 are nine electrical circuit breaker cams 69a through 69i inclusive, identified as follows, with each serving to open and close an electrical circuit breaker or switch associated therewith.

| Cam | Identification |
| --- | --- |
| 69a | Screw bit clutch pulse. |
| 69b | Do. |
| 69c | Counter reset. |
| 69d | Thyratron tube control. |
| 69e | Card read. |
| 69f | Error test. |
| 69g | Carry test. |
| 69h | Carry reset. |
| 69i | Start and stop control. |

Also mounted on the cam shaft 67 are a type key trip lever cam 70 and an escapement cam 71. The type key trip lever cam 70 is mounted adjacent the frame member 51, and the escapement cam 71 is mounted on the exterior side of frame member 52 on a stub portion 72 of the cam shaft 67 extending therebeyond.

In operation of the unit, rotation of the motor shaft 58 through the above described gearing results in rotation of the circuit breaker cams 69a through 69i, the type key trip lever cam 70 and the escapement cam 71.

Adjustment carriage assembly

Referring now to Figs. 12 to 14, the adjustment carriage assembly 97 is slidably supported on a circular slide 99 which is supported between the frame members 50 and 52. The adjustment carriage assembly 97 includes a carriage member 102 on which are mounted a type key depression assembly, generally designated 101 and a cam knock-off screw adjustment assembly generally designated 100.

*Type key depression assembly.*—The type key depression assembly 101 includes a type key actuating rod 83 rotatably mounted in a type key actuating rod supporting arm 84. The actuating rod supporting arm 84 is pivotally mounted on the carriage 102 and is adapted to be disposed above the keyboard of the typewriter being adjusted with the actuating rod disposed adjacent the typewriter keys. The type key actuating rod 83 is mounted in the supporting arm in such a manner as to provide an exposed end thereof as at 85. The actuating rod 83 is also provided with four fingers 86, each suitably displaced 90 degrees around its circumference and located at predetermined distances along the rod so as to coincide with the rows of the keys of the typewriter undergoing adjustment. Also mounted on the type key actuating rod 83 is a worm gear 103 in engagement with a horizontally disposed circular rack 82 which is supported by the frame members 50 and 52. The worm 103 and circular rack 82 form a rack and pinion assembly wherein horizontal displacement of the carriage 102 along the slide 99 results in rotation of the type key actuating rod 83 in an amount that is proportional to the amount of the linear displacement of the carriage 102. Through the above described arrangement the position of the carriage 102 on the slide 99 thus determines which typewriter key will be depressed by the actuating rod 83.

The actuating mechanism for the type key depression assembly is shown in Figures 4 through 7 and 9 through 11. The surface of the type key trip lever cam 70 is engaged by a spring biased cam follower 80 mounted on a spring biased type key trip lever bail 81. The type key trip lever bail 81 is rotatably mounted at its extremities on the shaft of the circular rack 82. In operation the type key trip lever bail 81 is rocked through a predetermined angular displacement about the circular rack 82 whenever the cam follower 80 engages the operating surface of the type key trip lever cam 70. The rotation of the type key trip lever bail 81 as described above results in the engagement thereby of the exposed end 85 of the type key actuating rod 83 and in a pivotal displacement of the type key depression assembly 101 relative to the carriage 102. As the position of the carriage 102 on the circular rack 82 properly locates the type key actuating rod 83 relative to the particular typewriter key for the type bar being adjusted, the engagement of the exposed end 85 results in depression of the selected type key and in actuation of the related type bar.

*Cam knock-off screw adjustment assembly.*—Referring to Figs. 12 to 14, the cam knock-off screw adjustment assembly 100 includes a screw bit member 20 mounted at the ends of a pair of supporting arms 96. The supporting arms 96 are of a suitable length to position the screw bit 20 in engagement with the cam knock-off adjusting screws 21 which are located beneath the keyboard of the typewriter undergoing adjustment. The supporting arms 96 are pivotally mounted as at 98 on the lower portion of the carriage 102 and are displaceable about their pivotal mounting 98 in response to displacement of the crown roller 95 mounted on a suitable supporting member extending therefrom. The screw bit member 20 is driven through the flexible drive shaft 200 and the drive therefor will be described in detail in a later portion of this specification.

The actuating mechanism for locating the screw bit member 20 relative to the cam knock-off adjusting screws 21 is best shown in Figs. 6 and 9 through 11. The surface of the escapement cam 71 is engaged by a cam follower roller 90 mounted on a cam follower bail 91. The cam follower bail 91 is pivotally mounted on the frame members 51 and 52 at 92 and is biased by a suitable spring 93. Attached to the cam follower bail 91 is a channeled bail 94 which serves as a track for the crown roller 95.

In operation the cam follower bail 91 and the channeled bail 94 are biased by the spring 93 so that the screw bit 20 is maintained in engagement with the cam knock-off adjustment screw 21 associated with the particular type bar being adjusted. When the operating surface of the escapement cam 71 engages the cam follower roller 90, the cam follower bail 91 and the channeled bail 94 are rocked about the pivot points 92. The displacement of the channeled bail 94 results in the displacement of the crown roller 95 positioned in the channel thereof and in the pivotal displacement of the screw bit supporting arms 96 about their pivot point 98 in the carriage 102. The displacement of the supporting arms 96 serves to disengage the screw bit 20 from the cam knock-off screw 21.

*Typewriter carriage return assembly*

In operation of the device, suitable means are provided to actuate the carriage return key of the typewriter undergoing adjustment after a set of adjustments on a given cam knock-off adjustment screw has been completed. This results in the presentation of a new line of type on a test sheet for each of the type bars.

Figure 11:
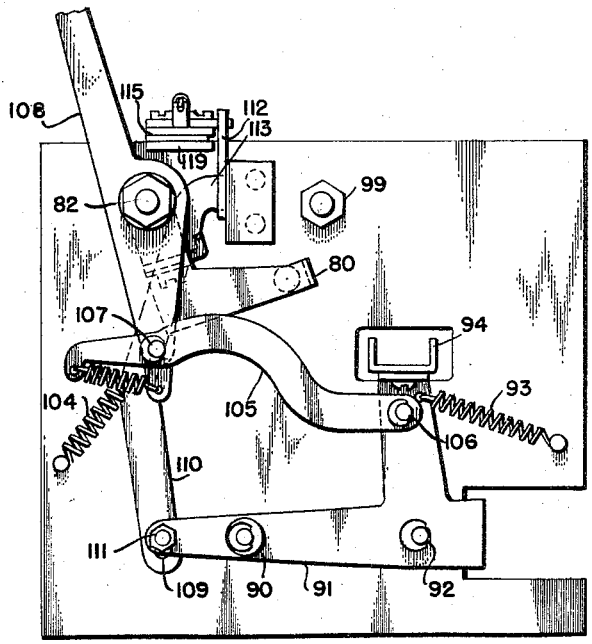
Fig. 11 is a side elevational view of the feed rack and escapement assembly.
Figure 4:
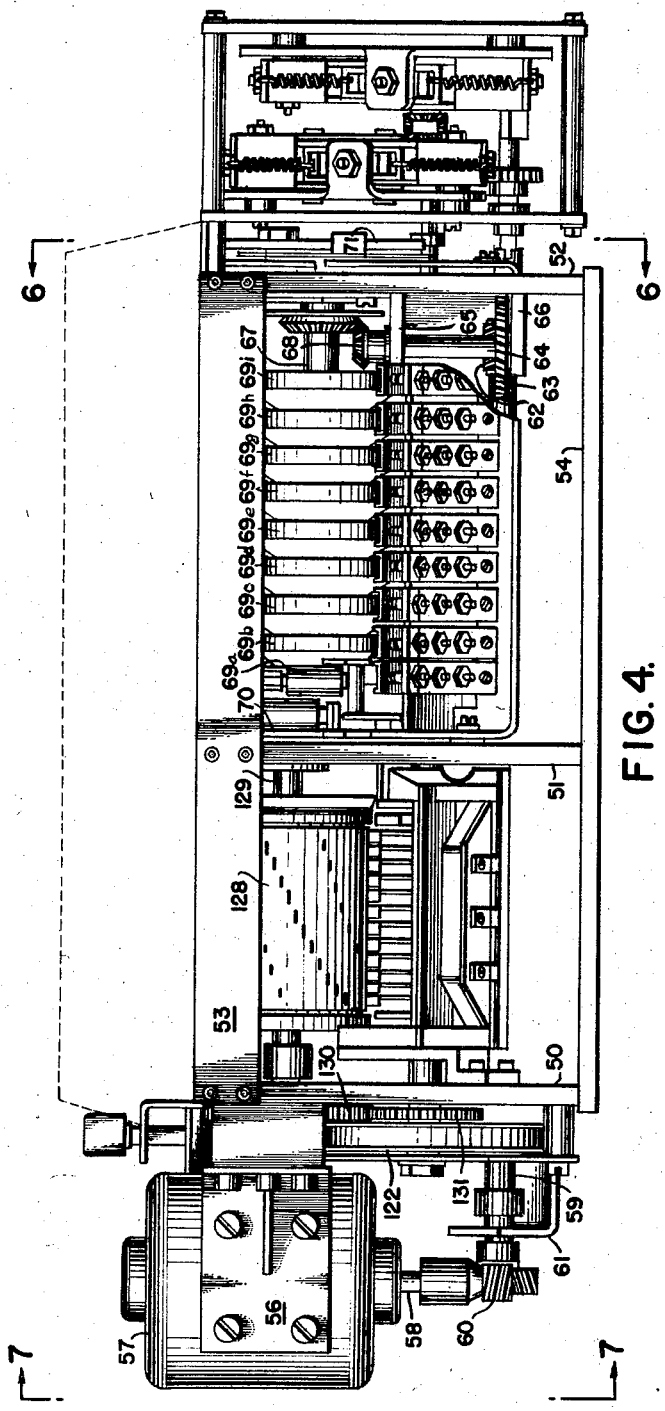
Fig. 4 is a front elevational view of the adjustment apparatus.
Figure 6:
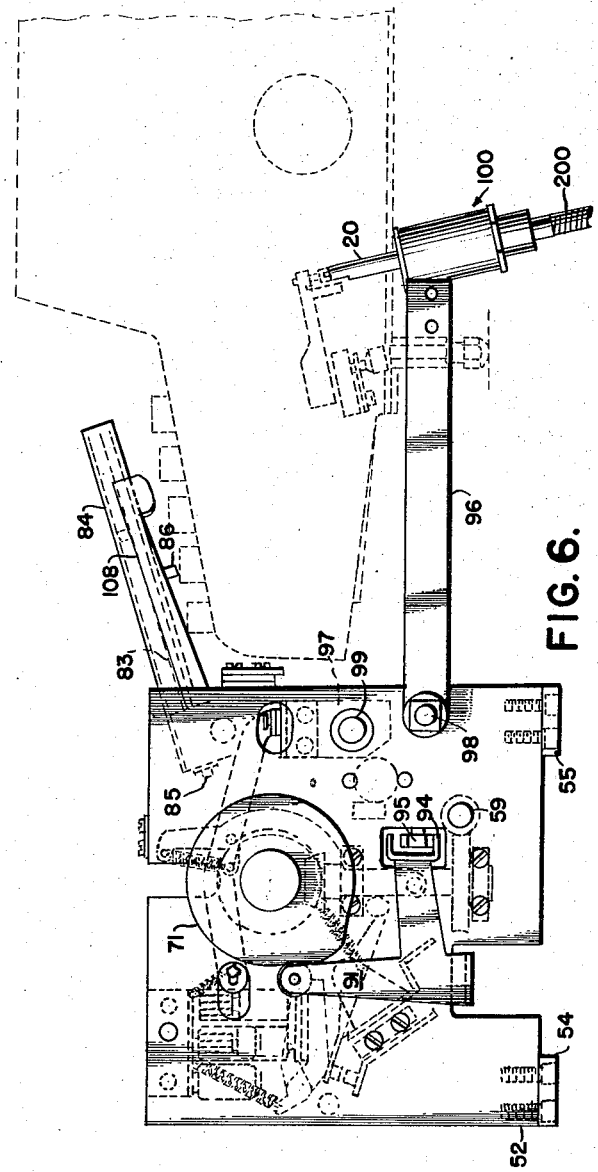
Fig. 6 is a side elevational view as viewed from the arrows 6—6 on Fig. 4.
Figure 7:
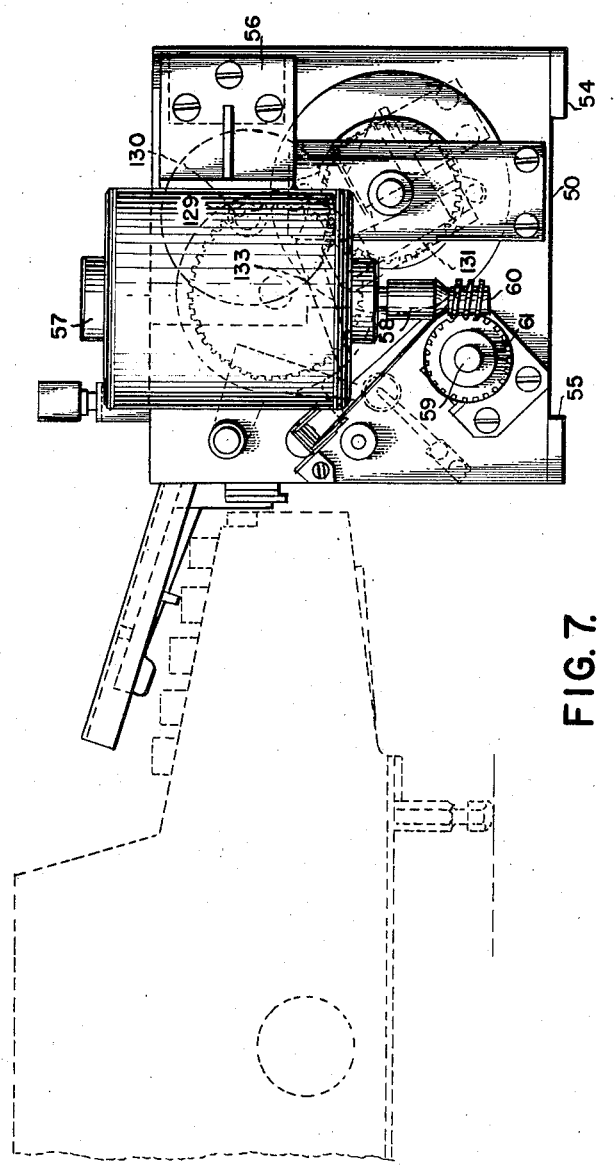
Fig. 7 is a side elevational view of a portion of the device as viewed from the arrows 7—7 on Fig. 5.
Figure 8:
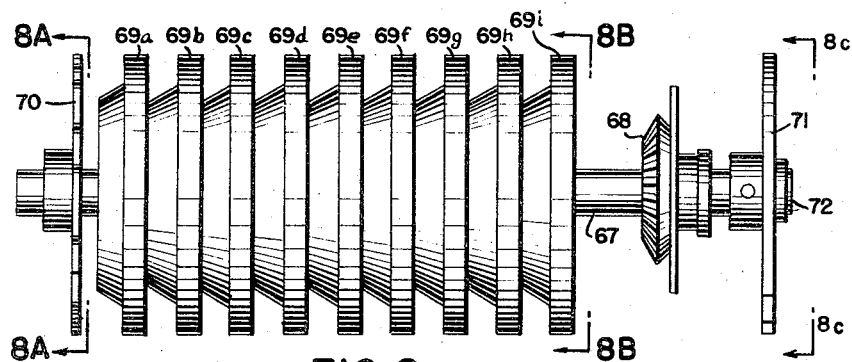
Fig. 8 is an elevation of the control cam shaft.
Figure 8A:
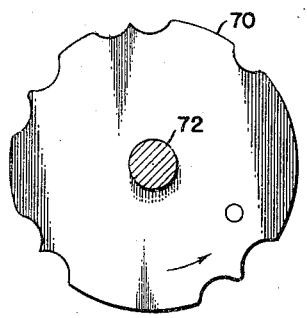
Figs. 8A, 8B and 8C are sections on the lines 8A—8A, 8B—8B and 8C—8C, respectively, of Fig. 8.
Figure 8B:
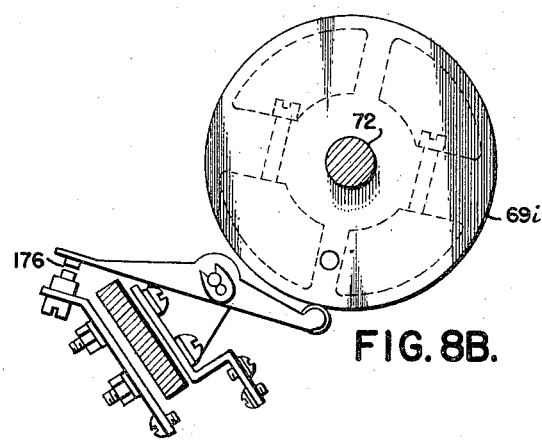
Figure 8C:
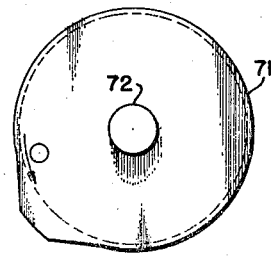

Referring to Figs. 9 through 11, the carriage return assembly includes a link member 105 pivotally mounted at 106 on the cam follower bail 91 adjacent the channeled portion 94 thereon. The link member 105 is also pivotally connected to a carriage return key actuating lever 108 and is normally biased with respect thereto by a spring 104. The carriage return key actuating lever is pivotally mounted on the stub portion of the shaft for the circular rack 82 that extends beyond the frame member 52, and the free end thereof is adapted to be positioned adjacent the carriage return key of the typewriter being adjusted.

In operation of the device, displacement of the cam follower bail 91 as described above also results in displacement of the link member 105 and in the pivotal displacement of the carriage return key actuating lever 108 about the axis of the circular rack 82 in such a manner as to depress the carriage return key on the typewriter undergoing adjustment.

*Adjustment carriage indexing system*

As described above at an earlier point in this specification the adjustment carriage assembly 97 includes a carriage member 102 which is slidably mounted on a circular slide 99 supported by the frame members 50 and 52. The drive means for advancing the adjustment carriage assembly 97 transversely of the typewriter keyboard will next be considered.

Referring to Figs. 9 to 11, the cam follower bail 91 is pivotally connected as at 111 and through an elongated slot 109 therein to a link member 110 disposed adjacent the interior surface of frame member 52. The link member 110 operatively engages one arm of a bell crank 112 at point 113. The bell crank 112 is pivotally mounted at 114 on a suitable mounting bracket 125 and the other arm thereof is provided with a bifurcated end which engages a stud 116 mounted on the escapement feed rack 115. The escapement feed rack 115 is movably mounted on an adjacent indexing rack 119 which is secured in fixed relation to the frame members 50 and 52. Mounted on the carriage 102 (Figs. 12 to 14) are an escapement pawl 117 which is biased to engage the escapement feed rack 115 by a spring 126, and an index pawl 121 which is biased to engage the indexing rack 119 by a spring 127.

Figure 15:
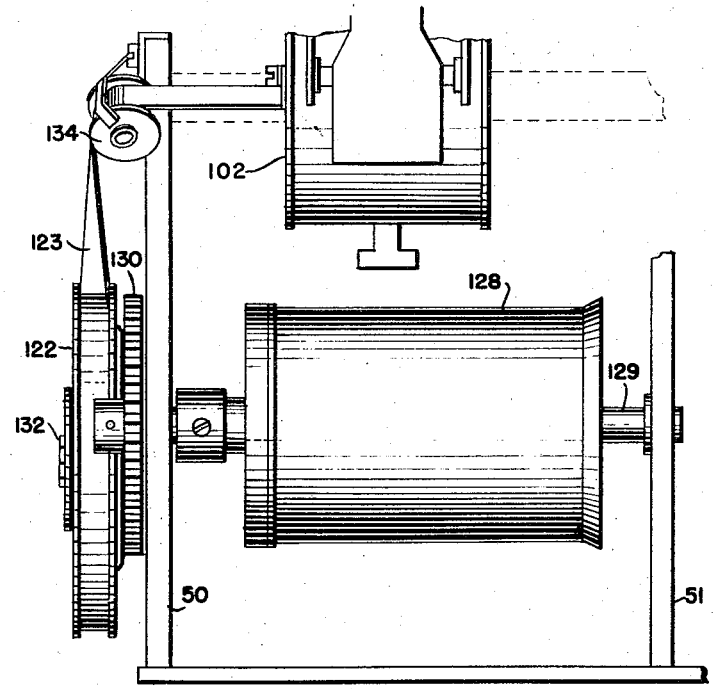
Fig. 15 is a plan view of the sensing unit and spring drum assembly.
Figure 16:
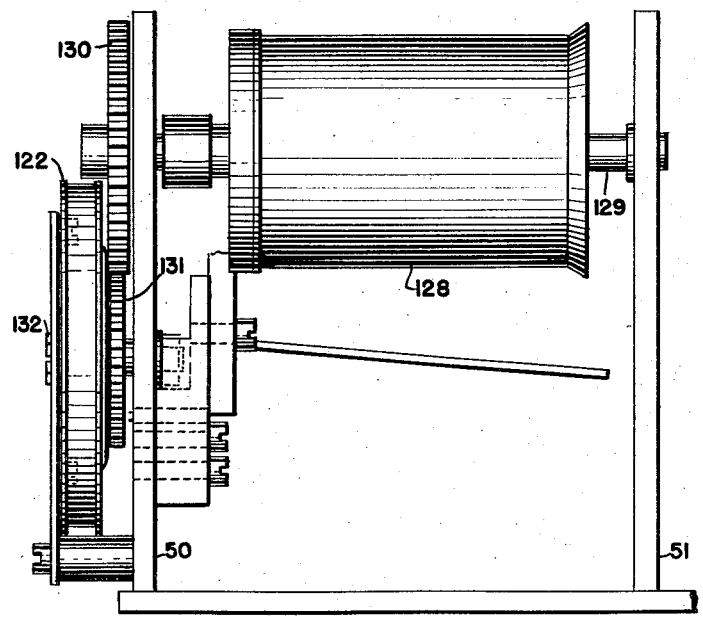
Fig. 16 is a front elevational view of the sensing unit and spring drum assembly.
Figure 17:
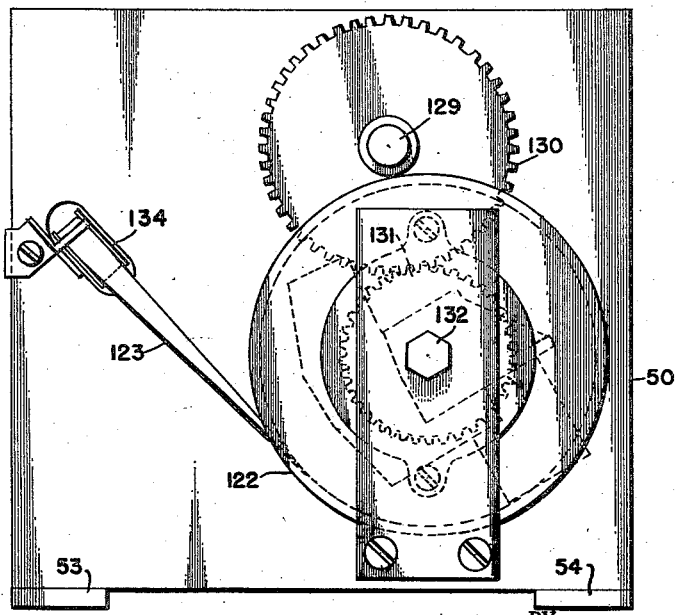
Fig. 17 is a side elevational view of the sensing unit and spring drum assembly.

In operation, engagement of the operating surface of the escapement cam 71 by the cam follower roller 90 results in a displacement of the cam follower bail 91 about its pivotal mounting 92. The displacement of the cam follower bail 91 is transmitted through link member 110 and bell crank 112 and results in a predetermined sliding displacement of the escapement feed rack 115 relative to the fixed indexing rack 119 from its normally biased position as determined by the escapement feed rack biasing spring 124. The displacement of the escapement feed rack 115 through engagement therewith by the escapement feed pawl 117 results in the carriage 102 being advanced from left to right along the circular slide 99 at a distance equal to one tooth on the indexing rack 119. The carriage 102 and the entire adjustment carriage assembly 97 is normally biased toward the left hand side of the typewriter keyboard under a constant spring load. Referring to Figs. 15 to 17, the spring loading of the carriage 102 is effected by a spring drum 122 mounted on a stub shaft 132 extending from frame member 50. The spring drum 122 has a tape 123 wound therearound and connected to the carriage 102 via a suitably located pulley 134. As the carriage 102 is displaced from left to right across the keyboard of the typewriter being adjusted, the tape 123 is unwound from the spring drum 122 thus tightening the spring contained therein.

*Adjustment carriage return system*

As described above, the adjustment carriage assembly 97 is advanced from left to right across the keyboard of the typewriter undergoing adjustment in step by step fashion through the action of the escapement feed rack 115 and the escapement feed pawl 117. After the adjustment carriage assembly 97 traverses the entire keyboard it is necessary to return it to its starting position so that operation may commence upon a new typewriter.

Referring to Figs. 18 through 20, the return of the adjustment carriage assembly 97 is controlled by a return solenoid 152 mounted in a suitable mounting bracket 151 adjacent the drum motor 57. The plunger 153 of return solenoid 152 is attached to a latch 154 at 155. The latch 154 is pivotally mounted adjacent one end thereof at 156 and is provided with a locking surface 157 at the other end thereof. Energization of the return solenoid 152 results in retraction of the plunger 153 and in a clockwise rotation of the latch 154 about its pivotal mounting 156. The displacement clockwise of the latch 154 against the action of its biasing spring 169 causes the locking surface 157 thereof to engage the edge 158 of one arm of an unlatching bell crank 159. The bell crank is pivotally mounted at 161 and is normally biased by a spring 160 in a counterclockwise direction. The engagement of the locking surface 157 by the unlatching bell crank 159 serves to lock the latch 154 in its extreme clockwise position and to maintain said latch in such position after the return solenoid 152 is deenergized. Mounted on the latch 154 is a stud 162 which connects the latch 154 to a pawl release bar 163. The pawl release bar 163 is disposed intermediate the escapement feed rack 115 and the indexing rack 119 and is mounted so as to permit a diagonal displacement thereof in response to displacement of the latch 154. Motion of the latch 154 in response to energization of the return solenoid 152 is thus transmitted to the pawl release bar 163 which causes it to be diagonally displaced relative to the escapement feed rack 115. The diagonal displacement of the pawl release bar 163 results in the lower ends thereof moving below the toothed edge of both the escapement feed rack 115 and indexing rack 119 and into engagement with the feed pawl 117 and index pawl 121, depressing said pawls and removing them from engagement with their respective racks. The disengagement of the escapement and index pawls 117 and 121 frees the adjustment carriage assembly 97 from restraint and permits it to return to its home or extreme left hand position relative to a typewriter keyboard under the influence of the spring drum 122 and tape 123 described above. After the above series of operations the latch 154 and bell crank 159 are maintained in locked relationship which, as described above, maintains the escapement feed and indexing pawls disengaged from their respective racks.

In order to initiate a new cycle of operation by placing the escapement feed pawl and indexing pawl in operational engagement with their respective racks, a start key 166 is provided. Depression of the start key 166 displaces the start key shaft 167 downwardly into engagement with the unlatching surface 168 on the pivotally mounted bell crank 159. This engagement displaces the bell crank 159 about its pivotal mount 161 and effects a release of the locked latch 154. The release of the locked latch 154 effects a counterclockwise displacement thereof under the influence of the biasing spring 169. The displacement of the now unlocked latch 154 results in an upward diagonal movement of the pawl release bar 163 and a restoration of the escapement feed pawl 117 and index pawl 121 to their operating position in engagement with their respective racks.

The displacement of the bell crank 159 through depression of the start key 166 also causes a switch actuating surface 170 thereon to close an electrical switch 171. The switch 171 serves to prepare certain electrical circuits, to be described in detail at a later point in this specification, for completion by an electrical circuit breaker cam 69 to inaugurate the start of another typewriter adjustment.

*Latching assembly*

As described above, the unit includes an adjustment carriage return system to return the adjustment carriage assembly to its starting position after completion of an adjustment cycle on a given typewriter. Associated therewith is a latching assembly for latching the various operating bails after completion of an adjustment cycle.

Figure 21:
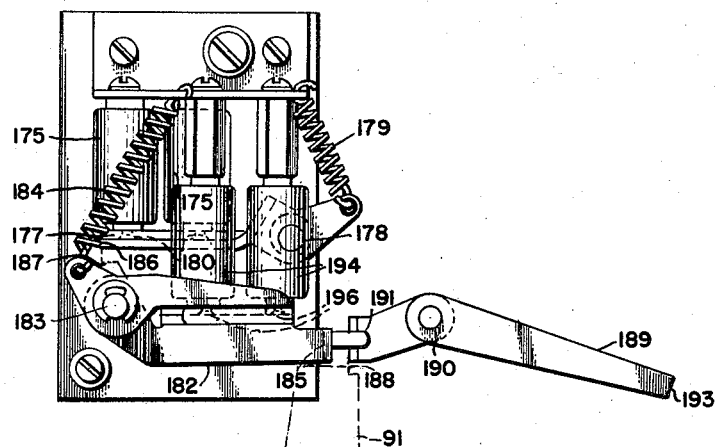
Fig. 21 is a front elevational view of the escapement bail latch assembly.
Figure 22:
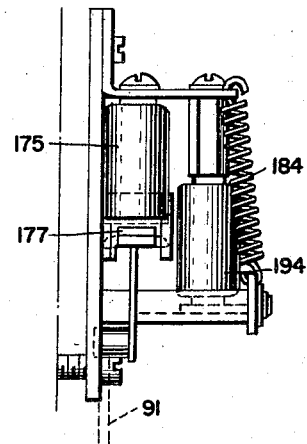
Fig. 22 is a plan view of the escapement bail latch assembly.
Figure 23:
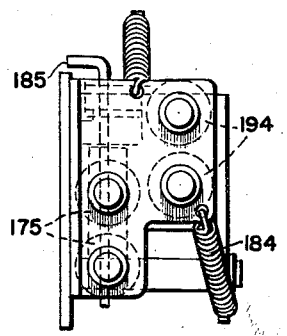
Fig. 23 is a side elevational view of the escapement bail latch assembly.

Referring now to Figs. 21 through 23, there is provided a latching and unlatching assembly for operation at the beginning and end of a complete typewriter adjustment cycle. A pair of latching magnets 175 are energized by a circuit through a relay point and an electrical circuit breaker 176 (see Fig. 8B) operated by circuit breaker cam 69i. Upon energization of the magnets 175, the armature 177, which is normally biased in a counterclockwise direction about its pivotal mounting 178 by a biasing spring 179, is displaced in a clockwise direction to engage the core surface 180. The latching mechanism also includes a latch arm 182 pivotally mounted at 183 and normally biased in a clockwise direction by a spring 184. Movement of the latch arm 182 in the clockwise direction, however, is restrained by the end 186 of the armature 177 engaging a notch 187 in the latch arm 182 when armature is in its unactuated or normally biased position. A latching member 185 is mounted on the end of the latch arm 182. As explained in detail at an earlier point in this specification, the engagement of the cam follower roller 90 with the operating portion 181 of the escapement cam 71 results in a rocking of the cam follower bail 91. Simultaneous operation of the cam follower bail 91 and the latching magnet armature 177 results in a clockwise displacement of the latch arm 182 and in engagement of the latching member 185 with a suitable notch 188 in the cam follower bail 91. This serves to lock the cam follower bail 91 in its extreme counterclockwise position and prevents operation of the type key depression assembly 101 and the cam knock-off adjustment assembly 100. The operation of the type key depression assembly 101 is prevented by the action of an intermediate lever 189 which is pivotally mounted at 190 and linked to the latch arm 182 at 191. The intermediate lever 189 is rocked by displacement of latch arm 182 and engages an auxiliary roller 192 mounted adjacent the cam follower roller in cam follower 80 (see Fig. 9) at surface 193 thus preventing cam follower 80 from engaging the key trip lever cam 70.

The latching of the cam follower bail 91 and the key trip lever bail 81 as described above results in deactuation of the type key actuation assembly 101 and the screw bit adjustment assembly 100 with the latter being positioned so that the screw bit 20 is maintained in lowered position out of contact with the cam knock-off adjustment screws 21.

Unlatching is effected by energization of the unlatching magnets 194 through an electrical circuit including the start switch 195 (see Fig. 26). The energization of the unlatching magnets 194 results in attraction of the armature 196 mounted on the latch arm 182 and in counterclockwise rotation of the latch arm. The displacement of the latch arm 182 results in release of the cam follower bail 91 and in locking of the latch arm 182 through engagement of the notch 187 therein by the end 186 of the armature 177 of the latch magnets 175.

*Space bar actuation assembly*

As mentioned earlier in this specification, an error in desired adjustment is effected by actuation of the space bar of the typewriter being adjusted so as to provide an error indication in the form of a space on a test sheet.

Referring now to Figs. 18 through 20, the error indicating mechanism is actuated by a solenoid 140. The plunger 141 of the solenoid 140 is pivotally attached to a link member 142 at 143. The link member 142 engages at 144 a space bar trip lever 145 which is pivotally mounted at 146 and is biased out of engagement with the space bar 149 of the typewriter being adjusted by a spring 147. The space bar trip lever is suitably shaped at 148 to engage the space bar 149 of the typewriter. When the solenoid 140 is operated, the plunger 141 thereof is retracted which results in a pivotal displacement of the space bar trip lever 145 by action of the link 142 in such a manner as to depress the typewriter space bar 149 and to thereby cause the error indication to appear in the form of a space on the test sheet.

Program unit

The settings for the desired density of typewriter impression as mentioned earlier are obtained from a prepunched record. In the illustrated embodiment, a standard tabulating card is utilized with a single column thereon being allotted to each type bar.

Referring to Figs. 4 through 7 and 15 through 17 there is provided a card drum 128 mounted on a shaft 129 supported by vertical frame members 50 and 51. Attached to the stub portion of the shaft 129 that extends adjacent the frame 50 is a gear 130 in mesh with a pinion 131 mounted on the shaft 132 of the spring drum 122. As the spring drum 122 derives its motion from the indexed movement of the adjustment carriage assembly 97 horizontally of the typewriter keyboard, the program drum 128 through the gear 130 and pinion 131 is rotated predetermined amounts in accordance therewith.

A prepunched program card is adapted to be placed around the circumference of the program drum 128 and to be thereby intermittently advanced column by column in accordance with the positional relationship of the adjustment carriage assembly 97 to the typewriter keyboard of the typewriter being adjusted. The prepunched programs in the program card are adapted to be sensed by a conventional sensing device such as the sensing wheels 133 (see Figs. 3 and 26).

Screw bit drive assembly

As described earlier in this specification, the screw bit 20 for the adjustment of the cam knock-off screws was driven through one end of a flexible drive shaft 200.

Referring to Figs. 12 through 14 and 24, the other end of the flexible drive shaft 200 is supported by the housing 199 and terminates in a bevel gear 201 contained therewith. The bevel gear 201 engages a bevel gear 202 slidably mounted on a directional drive shaft 203. The directional drive shaft 203 in turn is driven from a differential spider shaft 204 through an overload relief coupling 205.

The directional drive shaft 203 is mounted in frame member 52 in anti-friction bearings 206 and is urged by a suitable spring adjacent the end thereof to maintain a suitably slotted surface 208 in engagement with the drive balls 209 in the overload relief coupling unit 205. When sufficient resistance is met by the screw bit 20, the overload relief coupling functions in that the drive balls 209 are forced from the slotted surface 208 and urge the directional drive shaft 203 in a direction opposite to that urged by the biasing spring. This overload displacement causes the end 210 of shaft 203 (see Fig. 25) to operate an electrical contact 211 which signals an overload condition.

Referring to Fig. 24, the differential spider shaft 204 is under control of two clutches 215, one being mounted on each side of a differential pinion gear 216. Power to drive the differential unit is obtained from the main shaft 59 through coupling 217 and the clutch drive shaft 218. Mounted on the clutch drive shaft 218 so as to rotate therewith are a pair of gears 219 and 220. The gear 219 meshes with a clutch gear 221 mounted on a freely rotatable sleeve 222 and is thereby rotated whenever drive shaft 59 is rotated. Attached to the clutch gear 221 is a ratchet 223 which, upon energization of the clutch magnets 23, engages a suitable dog in a clutch of the type described in detail in U. S. Patent 2,658,599 and thereby serves to rotate the differential spider shaft 209. The gear 220 drives an intermediate gear 225 which in turn meshes with a clutch gear 226 which is similar in construction and mounting to previously described clutch gear 221.

ELECTRICAL COMPONENTS

The electrical components of the device are set forth in Figs. 26 through 29K. Fig. 26 illustrates the arrangement of the various cam contacts, program drum contacts and relay system for controlling the unit. Fig. 27 illustrates in schematic block form the electronic circuits including the photocell start and stop assembly, the 30 kc. square wave generator, the binary counter components, the carry test components, the screw bit control components, the error indication components, and a reset circuit for the start circuit. Fig. 28 is a timing chart for the cam operated electrical contacts, and Figs. 29A to 29K are details of the electronic circuits illustrated in block form in Fig. 27.

Timing control, start and sensing circuits

Referring first to Figs. 26 and 28, the drive motor 57 is started by the closure of a suitable switch in the motor circuit. As set forth earlier, rotation of the drive motor shaft 58 rotates the control cam shaft 67 on which are mounted the nine circuit breaker cams 69a through 69i, the key trip lever cam 70 and the escapement cam 71. The rotation of the control cam shaft 67 causes the cam contacts associated with the nine circuit breaker cams 69a through 69i to be operated sequentially in timed relation as indicated on the timing chart, Fig. 28.

In operation of the device, closure of the start key 195 results in energization of unlatching magnet 194 when the circuit therethrough is completed by closure of cam contact 69i. The energization of the unlatching magnet 194 results in the unlatching of the cam follower bails 80 and 91 which releases the screw bit adjustment assembly 100 that had been latched out of engagement with the cam knock-off adjusting screws 21. Closure of the start switch 195 also results, when cam contact 69i closes, in energization of the stop latch relay R10L. The energization of the relay R10L effects a closure of previously latched open relay point R10–1 which completes the power circuit for the program card sensing system, the error control circuits, the clutch drive control circuits and the carry test circuits.

Once the power circuit has been completed through closure of relay point R10–1, selected relays or combinations thereof in the group R1 through R6 are picked up when the card read circuit breaker cam 69c contact closes through the star wheel sensing contacts 240a through 240g. The star wheel sensing contacts 240a through 240g represent respectively the 12, 11, 0, 1, 2, 3 and 4 rows on a standard tabulating card set up in a six bit code and the combination of contacts closed will be determined by the preset punches in the particular column of the program card then being sensed. The code in the punched program card is representative of the 128's complement of the particular numerical value set to represent the desired speed of a type bar to effect a given impression density. When the selected relays in the group R1 through R6 are energized, the indicated value is fed into the binary counting unit through relay ponts R1 through R6 to set up said counter as will be described later in detail. Coincidentally therewith the selected relays in the group R1L through R6L will be latched for later use in resetting the predetermined value in the binary counter intermediate successive adjustment tests.

Screw bit drive clutch control

As described at an earlier point in this specification, provision was made for rotating the screw bit 20 in either direction depending upon the selective energization of the clutch magnets in the screw bit drive assembly. The forward and reverse drive clutch magnets 242 and 243, respectively, are selectively incorporated into the power circuit by the drive control relay points R7–1, the transfer element of which is connected to the power source 241 through circuit breaker cam contacts 69a and 69b and the now closed relay points R10–1. In the above circuit the position of the transfer element for the relay R7 thus determines which clutch will be engaged.

The energizing coil for the drive clutch relay R7 is included in the cathode circuit of a dual grid thyratron drive control tube 244. The tube 244 has its cathode 245 and suppressor grid 251 connected to ground through a resistor 246 paralleled by relay R7. The control grid 247 is connected to ground through resistors 248 and 249, and the plate 250 thereof is connected to the direct current source 241 through circuit breaker cam contact 69d. Closure of cam contact 69d completes the tube circuit and conditions the drive control tube 244 to conduct if a positive pulse is applied to the control grid 247 thereof. If a positive pulse is not received on grid 247, the tube will not fire and the drive control relay R7 will not be energized. This keeps the forward drive clutch magnet 242 connected in the power circuit and results in energization of the same whenever cam contacts 69a and 69b are closed. If a pulse is received upon the control grid 247 whenever cam contacts 69a and 69b are closed, the tube 244 will conduct, and the flow of current therethrough will energize the drive control relay R7. Energization of relay R7 shifts the points in R7–1 and places the reverse clutch magnet 243 in the power circuit. The reverse clutch magnet 243 will be energized whenever cam contacts 69a and 69b are closed and will result in driving the screw bit 20 in the opposite direction. The duration and amount of adjustment effected by the screw bit 20 is determined by the time during which cam contacts 69a and 69b are closed and is such to effect a sequential adjustment of 2, 1, ½ and ¼ turns. One series of four actuations is sufficient to bring about an adjustment within an allowable tolerance range.

Error indication

As described earlier in conjunction with the mechanical components of the device, an error indication was effected by actuation of the typewriter space bar in response to energization of the space solenoid 140.

Energization of the space solenoid 140 is effected by a circuit which includes cam contact 69d and the error control thyratron tube 254. The thyratron 254 is included in a circuit similar to that previously described in conjunction with the thyratron drive control tube 244 wherein the control grid 255 thereof is suitably biased by resistors 256 and 257, and the cathode 258 and suppressor grid 261 are connected to ground through a resistor 259 paralleled by the energizing coil for the error relay R8. The plate 260 is connected to the source potential 241 through cam contact 69d and closed relay points R10–1. As was the case with the thyratron drum control tube 244, the plate circuit for the error control tube 254 is completed through closure of circuit breaker cam contacts 69d, and the tube is thus conditioned so that it will conduct if a positive pulse is received upon the control grid 255. If such a positive pulse is not received on the control grid 255 during the period when the cam contact 69d is closed, the error relay R8 will not be energized. If an error pulse is applied to the control grid 255 during the time when cam contact 69d is closed, the error tube 254 will conduct, and the current flowing through the coil of the error relay R8 will energize the same and will result in the energization of the space solenoid 140 in the period while cam contact 69f is closed which, as illustrated on the timing chart, Fig. 28, follows the four double actuations of the type key actuation rod 83 under control of the key trip lever cam 70 and precedes the final actuation thereof. The energization of the space solenoid 140 will result in actuation of the typewriter space bar and will provide a space on the test sheet that is indicative of an error.

Completion of adjustment cycle

After a complete adjustment cycle has been finished by an adjustment of the cam knock-off screw for the final type bar, the binary counter is reset to zero through closure of cam contact 69i and the latching relays R1L through R6L. A suitable punch designation is then sensed in the program card by sensing contact 240g which results in energization of End relay R9. The energization of End relay R9 results in closure of relay contacts R9–1 and R9–2. The closure of relay contacts R9–1 coincidentally with closure of cam contact 69i results in actuation of the stop relay R10 and an opening or relay contacts R10–1 in the power circuit to cam contacts 69a, 69b, 69d, 69e and 69g. Closure of relay contacts R9–2 results in energization of the adjustment carriage return solenoid 152 and the latching solenoid 175. This, as described earlier, initiates a return of the adjustment carriage assembly 97 and a latching of the screw bit adjustment assembly 100 away from the cam knock-off screw heads 21.

Comparison counter

Referring to the block circuit diagram Fig. 27, each of the block units there illustrated represents an electronic pluggable unit comprising an electronic subcircuit. The circuit details of these pluggable units will be described at a later point in this specification.

When a type bar is actuated, it first passes the start photocell 1 and results in the production of a short positive electrical pulse being applied to the input pin 6 of a 9–100X start thyratron 265, triggering said unit and causing the tube therein to conduct. The triggering of the 9–100X start thyratron 265 produces a short negative pulse on the output pin 4 thereof which is applied to the input pin 3 of a TR–3A start trigger 266 and serves to trip the same. The TR–3A start trigger 266 is provided with suitable terminals for obtaining a full and a partial output therefrom. The partial output is obtained from output pin 8 and is applied to the input pin 3 of a TR–3A stop trigger 267 and trips the same. The full output of the TR–3A start trigger 266 is taken from output pin 7 thereof and is applied to input pin 5 of an IN–5 inverter switch 268. The output of the tripped TR–3A stop trigger 267 is simultaneously applied to input pin 3 of the IN–5 inverter switch 268. The application of the combined outputs of the TR–3A start and stop triggers 266 and 267 cuts off the IN–5 inverter, and the resultant rise in plate voltage therefrom appears on output pin 6 and is applied to the input pin 9 of a PS–3A gate 269. This voltage serves to condition the PS–3A gate 269 for conduction.

There is also provided a 30 kc. square wave generator generally designated 270. Square wave generators are well known in the art as are the shaping circuits usually associated therewith, and may be, for example, a crystal controlled oscillator in conjunction with a pair of clipper circuits in the form, for example, of overdriven amplifiers. The 30 kc. square wave output of the square wave generator 270 is applied to input pin 6 of the PS–3A gate 269 which has been conditioned for conduction by the voltage applied to input pin 9 thereof as described above.

The output of the PS–3A gate 269 is taken from pin 4 thereof and is in the form of a series of 30 kc. square pulses. This output is fed through a PW–2 power amplification stage 273 through input pin 9 thereof. The output of PW–2 power stage 273 is taken from pin 4 and is applied to the input pin 3 of a TR–4 half count trigger 274. The TR–4 half count trigger 274 will provide an output wave form having half the frequency of the input wave form. The 15 kc. square wave output of the TR–4 half count trigger 274 is applied to the input pin 6 of the TR-4 No. 1 count trigger of the binary counting unit generally designated 275.

The binary counting unit 275 is conventional in nature and consists of seven TR-4 count triggers connected in cascade. Each of the TR-4 count triggers constituting the binary counting unit 275 are of such character to produce one output pulse in response to receipt of two input pulses. The seven stages may be considered as the No. 1, 2, 4, 8, 16, 32 and 64 counters. As thus constituted, the binary counting unit 275 has a capacity of 127. The binary counting unit 275 is of such a character as to permit preset storage of a number representative of the sensed program through the program relays R1 through R6.

When the actuated type bar passes the stop photocell 2, it results in the production of a short positive electrical pulse which is applied to the input pin 6 of a 9–100X stop thyratron 285 triggering said unit and causing the tube therein to conduct. The triggering of the 9–100X stop thyratron 285 produces a short negative pulse on the output pin 4 thereof which is applied to the input pin 6 of a TR-3 stop trigger 267, and serves to return the TR-3 stop trigger 267 to its normal operating condition (it having previously been tripped by the partial output of the TR-3A start trigger 266). The return of the TR-3 stop trigger 267 to its normal operating condition results in the production of a positive voltage on the output pin 7 thereof which is applied to the input pin 3 of the IN-5 inverter switch 268. The application of the positive voltage to the input pin 3 of the IN-5 inverter switch 268 results in a dropping of the potential at output pin 6 thereof which is connected to the input pin 9 of the PS-3A gate 269. This serves to cut the PS-3A gate 269 off and to prevent the entry of any additional pulses from the square wave generator 270 into the binary counting unit 275. Thus the PS-3A gate 269 was rendered conducting by the passage of the type bar past the start photocell 1 and was returned to a non-conducting condition by the passage of the type bar past the stop photocell 2. The interval during which a PS-3A gate 269 was conducting is readily measured by the number of pulses that passed through the gate and thereby serves as a direct measure of the type bar speed.

If the total count from the preset value on the program card plus the counted 30 kc. square wave pulses passing through the PS-3A gate 269 is 128 or greater, there will be an output from the No. 64 TR-4 count trigger in the binary counting unit 275. The number of pulses emitted from the No. 64 counter will be determined by the speed of the type bar and the preset program value. This output may be considered as a "carry" pulse. The output of the No. 64 counter in the binary counting unit 275 in the form of a carry pulse or a series of carry pulses is applied to the input pin 3 of a TR-4 carry trigger 286 and is indicative of the fact that the type bar has travelled too slowly. The TR-4 carry trigger 286 is triggered by the carry pulse or pulses and the output thereof is taken from pin 7 and is applied to a PW-2 power amplification unit 287.

Half of the output of the PW-2 power stage 287 as obtained from output pin 4 is applied to the input pin 6 of the TR-4 first carry count trigger 288 and trips the same, and is also applied to the input pin 3 of a TR-4 single carry trigger 289 to turn the same on and which stays on until reset. The output pin 7 of the TR-4 single carry trigger is connected to the input pin 5 of a CF-5 carry switch 293. The positive output of the TR-4 single carry trigger 289 conditions the CF-5 carry switch 293 so that a subsequent carry test pulse will not cut off the switch and result in actuation of the error control tube. As such it serves to prevent tripping of the error control tube 254 by a carry test pulse, which will be described at a later point in the specification.

A second carry pulse emitted from the No. 64 counter 274 in the binary counting unit 275 passes through the PW-2 power stage 287 and the already tripped TR-4 first carry count trigger and is applied to input pin 6 of a TR-4 second carry count trigger 290, triggering the same. In a similar manner, a third carry pulse emitted from the No. 64 counter 274 is counted both in the TR-4 first and second carry count triggers 288 and 290, and a fourth carry pulse produces an output from the TR-4 second carry count trigger 290.

The full output of the PW-2 power stage 287 appears on output pin 3 thereof and is applied to the input pin 5 of an IN-6 inverter 291 and serves to cut off the same. The positive output of the cut-off IN-6 inverter 291 is applied from output pin 7 thereof to the grid 251 of the drive control tube 244 (Fig. 26) previously described and serves to initiate an actuation of the reverse clutch magnet as earlier described.

If there are four or more carry pulses emitted from the No. 64 count trigger 274 on the fourth check of a type bar, a negative output will be supplied on output pin 8 of the TR-4 second carry count trigger 290. This negative output is applied to the input pin 7 of an inverter stage 292, and the inverted and positive output therefrom appearing on output pin 8 will be applied to the grid 261 of the error control tube 254 (Fig. 26) previously described. The positive pulse output from the inverter 291 will result in conduction of the error control tube 254 and energization of the error relay R8 as described in detail at an earlier point in the specification.

It is also desirable to provide for an error indication if no carry pulses are emitted from the No. 64 count trigger 274 since this is also indicative that proper adjustment has not been achieved. If the TR-4 single carry trigger 288 is not tripped by receipt of a carry pulse from output pin 4 of the PW-2 power stage 287, no pulse will be applied therefrom to the input pin 5 of the CF-5 carry switch 293 and said switch will therefore be conditioned for receipt of a test pulse. There is also provided a TR-31 carry test trigger 294 adapted to be actuated by a carry test pulse applied to the input pin 6 thereof through the closing of the carry test circuit breaker cam 69g.

The application of the carry test pulse to the input pin 6 of the TR-31 carry test trigger 294 flips the trigger and results in a negative pulse appearing at output pin 7 thereof. This negative pulse is applied to input pin 8 of the CF-5 carry switch 293 and cuts it off. The cutting off of the CF-5 carry switch 293 results in the application of a negative pulse to the input pin 3 of the IN-6 inverter 291. This serves to cut off the IN-6 inverter 291, and the positive output thereof appearing at output pin 6 is utilized to fire the error control tube 254.

A one-shot TR-5 multivibrator 295 is provided to reset the TR-3 start trigger 266 after each test on a type bar. After the type bar passes the stop photocell 2, it must repass the start photocell 1 on its movement back to its rest position. The TR-3 start trigger 266 must be reset for the second of the actuations of the type bar, but of course cannot be reset before the type bar returns to its rest position. When the TR-3 stop trigger 267 is returned to its normal condition by the pulse received from the 9–100X stop thyratron 285 in response to passage of the type bar past the stop photocell, the negative output thereof at pin 8 is applied to the input pin 3 of the TR-5 multivibrator to trip the same. A RC delay circuit is incorporated in the TR-5 multivibrator 295 to hold the latter in its tripped condition until after the type bar has fallen back past the start photocell 1. At the end of the delay time as determined by the RC circuit, the TR-5 multivibrator 295 flips back to normal and the negative output appearing at pin 8 thereof is fed to the input pin 6 of the TR-3 start trigger 266 returning the latter to its normal condition so that it will be responsive to the next forward movement of the type bar.

Through the above described comparison counting unit the speed of the type bar is measured and is compared with a preset speed setting that is representative of the desired density of the type impression. As shown in Fig. 28, the first comparison is effected in response to the first actuation of the type keys and depending upon whether the measured type bar speed is too high or too low, a major adjustment is effected through actuation of the suitable drive clutch magnet and through cam contacts 69a and 69b, which control the duration of the actuation of the screw bit 20. As mentioned earlier, the first actuation thereof is for a duration that permits two turns. After completion of the first comparison, the counter is reset through circuit breaker cam 69c (Fig. 26) and a second comparison is effected in a similar manner. After the second comparison is made, an intermediate adjustment, if necessary, is effected under the control of the cam contacts 69a and 69b which limit the duration of the actuation of the screw bit 20 in this instance to one turn. In a similar manner a third and a fourth comparison are made with duration time for the actuation of the screw bit permitting one-half and one-quarter turns, respectively. This series of four comparisons is followed by a final or error test comparison as described above. Generally, however, one series of four actuations will be sufficient to bring about an adjustment within the allowable range.

*Component circuit elements*

In order to more fully described the invention, the nature of the circuits schematically illustrated in block form in Fig. 27 will now be individually described.

*9–100X stop and start thyratrons.*—The 9–100X stop and start thyratrons are preferably pluggable units. They are identical in construction and the circuit details thereof are illustrated in Fig. 29A.

The positive pulse input from the respective start and stop photocells 1 and 2 is applied through input pin 6 and coupled to the control grid 300 through a coupling capacitor 301. The grid 300 is normally biased through a resistor 302 and pin 3 which is adapted to be connected to a suitable source of variable negative biasing potential so as to maintain the tube in a non-conducting condition in the absence of a positive voltage pulse applied through input pin 6. The suppressor grid 303 and the cathode 304 are grounded. The plate 305 is connected through resistors 306 and 307 to pin 5 which is adapted to be connected to a suitable source of D. C. plate potential such as 150 volts. Pins 5 and 6 are connected by a resistor 308 and the tube output is taken from pin 4. The plate is also bypassed to ground by a capacitor 309.

As the tube is normally biased just beyond cut off, the application of a positive pulse to pin 6 results in tube conduction. The flow of current through resistor 306 resulting therefrom results in the appearance of a negative output pulse at output pin 4.

*TR–3A stop and start triggers.*—The TR–3A stop and start triggers 266 and 267 are preferably pluggable units in the nature of an externally triggered flip-flop multivibrator using a dual tube of the 6J6 type. The stop and start triggers are similar in construction, and for the purposes of convenience the circuit for the start trigger 266 will be first described and will be followed by the points of difference thereover for the stop trigger 267.

As illustrated in Fig. 29B for the TR–3A start trigger 266, a negative pulse input is adapted to be applied to the grid 310 through input pin 3, a coupling condenser 311 and a parasitic suppressor resistor 312. The half of the tube containing grid 310 is normally conductive. The other half of the tube is cut off when the first mentioned half thereof is in a conductive condition. The application of a negative pulse to the grid 310 tends to decrease the amount of current flow through that portion of the tube and through the plate load resistors 313 and 314 which are connected intermediate the plate 315 and pin 9. Pin 9 is adapted to be connected to a suitable source of D. C. plate potential such as a common 150 volt supply. The decrease in current flow through the resistors 313 and 314 results in a rise in potential of plate 315. This rise in potential is transmitted to the grid 316 of the other half of the tube through resistor 317 and 318 and capacitor 319. This half of the tube had been maintained in a non-conducting condition by a voltage divider which included resistors 313, 314, 318 and resistor 320 which is connected through pin 5 to a suitable source of negative D. C. biasing potential such as minus 100 volts. The application of the positive potential to the grid 316 resulting from the decrease in current flow through the other half of the tube results in tube conduction and in initiation of current flow through plate load resistors 321 and 322. The flow of current through resistors 321 and 322 results in a drop in potential on plate 322. This drop in potential is transmitted through capacitor 324 and resistors 325 and 312 to the grid 310. This serves to reinforce the negative triggering pulse applied thereto through pin 3 and results in accelerating the cutting off of that half of the tube. The increase in current flow in the portion of the tube controlled by grid 316 results in the production of full amplitude negative pulse on pin 7 and potential negative output pulse on pin 8.

The multivibrator is stable in nature and when triggered, as for example by a negative pulse on pin 3, conduction of the portion of the tube controlled by grid 310 will cease and conduction will commence in the portion of the tube controlled by grid 316. This latter portion of the tube will then remain in conduction and in a stable condition until it is flipped by an externally applied pulse through input pin 6. Input pin 6 is connected to the grid 316 through a coupling capacitor 326 and is adapted to receive the negative reset pulse from the TR–5 multivibrator 295.

The TR–3 stop trigger 267 is essentially the same as the TR–3 start trigger 266 described above except that in this instance pin 6 is adapted to receive the pulse from the 9–100X stop thyratron 285 and that output pin 8 is connected intermediate resistors 313 and 314. Output pin 8, as will be described in detail later, is adapted to be connected to input pin 3 of TR–5 multivibrator 295 and serves to trip the same.

*IN–5 inverter switch.*—The IN–5 inverter switch is preferably a pluggable unit comprising two individually controlled single stage amplifiers with a common output.

As illustrated in Fig. 29C, both halves of the dual tube are normally in a conducting condition. The application of a negative pulse to the grid 329 through input pin 5, resistors 330 and 331 and capacitor 332 and a negative pulse on grid 334 through input pin 3, resistors 335, 336 and capacitor 337 is required to completely cut the tube off. The cessation of current flow through the plate load resistor 333 and 338 resulting therefrom results in a rise in voltage on output pins 6 and 7. Similarly the application of a positive pulse to either of the grids 334 and 329 results in a decrease in the voltage appearing at common output pins 6 and 7. However as used in this particular circuit, grid 334 receives the positive pulse. The grids 329 and 334 are biased through resistors 339 and 340, respectively, connected to pin 4 which is adapted to be connected in turn to a suitable source of negative D. C. biasing potential. Pins 8 and 9 are connected in common and are adapted to be connected to a suitable source of D. C. plate potential.

*IN–6 inverter.*—The IN–6 inverter is preferably a pluggable unit comprising a pair of independent inverter circuits utilizing a common dual tube.

As illustrated in Fig. 29D, the application of a negative pulse to the grid 341 through input pin 5, resistors 342 and 343 and capacitor 344 serves to decrease tube conduction and, if of sufficient amplitude, to cut off half of the tube. The reduction or cessation of current flow through the plate load resistor 345 resulting therefrom results in the production of a positive pulse on output pin 7. The resistor 345 is included in the plate circuit and is connected to output pin 8 which is adapted to be connected to a suitable source of D. C. plate potential. The grid 341 is normally biased through resistor 346 connected to pin 4 which in turn is adapted to be connected to a suitable source of negative D. C. biasing potential.

In a similar manner the application of a negative pulse to the grid 347 through input pin 3 and resistor 348 serves to reduce or, depending upon the amplitude of the input pulse, stop the current flow through plate load resistor 349 and to result in the appearance of a positive pulse on output pin 6.

*IN–7 inverter.*—The IN–7 inverter is preferably a pluggable unit and is almost identical in construction with half of the IN–6 inverter previously described.

As illustrated in Fig. 29E, the application of a negative input pulse to the grid 350 through input pin 7, resistors 351 and 352 and capacitor 353 serves to reduce or, if of sufficient amplitude, to halt current flow through plate load resistor 355. The reduction or cessation of current flow through plate load resistor 355 causes a positive pulse to appear on output pin 8. The plate load resistor 355 is connected intermediate the plate of the tube and output pin 5 which is adapted to be connected to a suitable source of D. C. plate potential. The grid 350 is normally biased through resistor 354 connected to output pin 6 which in turn is adapted to be connected to a suitable source of negative D. C. biasing potential.

*PS–3A gate.*—The PS–3A gate is preferably a pluggable unit comprising a single tube with a dual control input and a common output.

As illustrated in Fig. 29F, the first control grid 359 is connected to the input pin 9 through resistors 360 and 361, the latter being bypassed by a suitable condenser 362. Bias for the grid 359 is obtained through resistor 363 connected to output pin 8 which is adapted to be connected to a suitable source of negative D. C. biasing potential. The second control grid 364 is connected to the input pin 6 through resistors 365 and 366, the latter being bypassed by condenser 367. Bias for the grid 364 is obtained through resistor 368 also connected to output pin 8 previously identified. The suppressor grid 374 is grounded as is the cathode of the tube. The dual screen grids 369 and 370 are connected to pin 5 through resistor 371 and are bypassed to ground through capacitor 372. The pin 5 is adapted to be connected to a suitable source of positive D. C. potential which may be the plate supply. The plate of the tube is connected to pin 3 through a plate load resistor 373. The pin 3 is adapted to be connected to a suitable source of D. C. plate potential. The output of the tube is taken from the plate circuit via pin 4.

In operation of the unit, the appearance of a positive voltage on the first control grid 359 obtained through input pin 9 primes the tube for the conduction. The appearance of a voltage wave, in this instance a square wave, on the second control grid 264 results in the appearance of an inverted square wave on output pin 4. This square wave will continue to appear on output pin 4 until voltage of the grid 359 is decreased, cutting the tube off. The unit thus serves as a gate which passes the square wave from input pin 6 whenever a suitable voltage permitting the same is applied to the first control grid 359.

*PW–2 power stage.*—The PW–2 power stage is preferably a pluggable unit and is a single stage amplifier utilizing a power tetrode.

As illustrated in Fig. 29G, the tube is normally conducting. The application of an input pulse to the control grid 375 through resistors 376 and 377, the latter being bypassed by capacitor 378, results in the power amplification of the input wave. The suppressor grid is connected to the cathode and is grounded. The screen grid is connected to pin 6 through resistor 382. The pin 6 is adapted to be connected to a suitable source of positive D. C. potential. The plate of the tube is connected to a pin 5 through resistors 380 and 381. Pin 5 is adapted to be connected to a suitable source of D. C. plate potential. The tube is provided with a dual output, the first output being obtained from pin 3 and a second output being obtained from pin 4.

*TR–4 triggers.*—The TR–4 triggers are preferably pluggable units and the same basic circuit is used for the half count trigger 274, the No. 1, 2, 4, 8, 16, 32 and 64 count triggers, the carry trigger 286, the first and second carry count triggers 288 and 290 and the single carry trigger 289. In the interests of brevity a circuit for the No. 1 count trigger will be first described, and the points of difference thereover for the remaining triggers will be then pointed out.

As illustrated in Fig. 29H, the circuit for the No. 1 count trigger includes a dual tube having two halves 384 and 385. The basic circuit is that of a multivibrator. The grid 386 of the tube 384 is connected through resistors 387 and 388, the latter being bypassed by capacitor 389 to the plate 390 of the second half of the tube 385. In a similar manner the grid 385a of the second half of the tube is connected through resistors 391 and 392, the latter being bypassed by a capacitor 398 to the plate 393 of the first half of the tube 384. The plate 393 is connected to output pin 9 through plate load resistors 394 and 395. The plate 390 is connected to the pin 9 through plate load resistors 396 and 397. Pin 9 is adapted to be connected to a suitable source of D. C. plate potential such as 150 volts. The cathodes of both halves of the tube are grounded.

The grids 386 and 385a are biased through resistors 401 and 402 respectively, connected to pins 5 and 4 respectively. Pins 5 and 4 in this instance are connected to the transfer element of the relay R1. In a similar manner the pins 5 and 4 of No. 2 counter are connected to the transfer elements of relay R2, the pins 5 and 4 of No. 4 counter are connected to the transfer elements of relay R3, and so forth. If, as we are assuming, the circuit of Fig. 29H is for the No. 1 counter, the pin 5 is connected to the transfer element of relay R1–1 and pin 4 is connected to the transfer element of R1–2. The transfer elements are shiftable in accordance with the operation of the particular relays from contact with the minus 100 volt common biasing line and the minus 100 volt common reset line.

The TR–4 trigger is provided with a common input through pins 6 and 3. If it be assumed that tube 385 is conducting, the application of a negative input pulse of sufficient amplitude to the common input pins 6 and 3 will serve to cut off both tubes 384 and 385 for an instant. The capacitors 389 and 398 are considerably larger than capacitors 400 and 399 so that there will be very little change in the voltage across capacitors 389 and 398 in the time required for the smaller coupling capacitors 400 and 399 to reach a steady state condition. Because of the fact that tube 385 was previously conducting, the rate of voltage rise will be much greater on the grid 386 than on the grid 385a. Hence tube 384 will start conducting first and the flow of current to the plate load resistors 394 and 395 will result in a drop of plate potential which is applied to grid 385a and serves to block that half of the tube from conducting, and will cause a positive pulse to appear on output pin 8. This positive voltage will be maintained on output pin 8 until the next negative input pulse is received. At this time the half 385 of the tube will conduct and will produce a negative voltage wave on output pin 8. The output of the capacitors 389 and 398 will produce the desired triggering action and the trigger will thus reverse itself every time the grids are given a negative pulse of sufficient amplitude.

The time constants of the trigger circuit are such as to render it considerably more sensitive to negative pulses than it is to positive pulses. Therefore if the input pulse is kept within a reasonable amplitude, the trigger will only respond to negative shifts in voltage of an input square wave, and as such the circuit is responsive only to a negative input pulse. Through the above described circuit elements, the TR-4 trigger will only be responsive to a negative input pulse and hence will produce a single output pulse in response to two input pulses.

In the counter 274 the various counting triggers therein may be preset through the program relays so as to predetermine which half of the tube is conducting prior to receipt of an input square wave. This permits a delay of the triggering action and a resultant passage of a single pulse therethrough in response to a single input pulse. In this manner the number representative of the program may be preset in the counter 275, and the counter will thus serve to add the preset value in the number of square wave pulses entering therein within the time required for the type bar to pass the start and stop photocells. The counter is conventional in nature and the method of presetting is likewise well known in the art.

The No. 2, 4, 8, 16, 32 and 64 TR-4 counting triggers are all identical with the trigger described above except that pins 5 and 4 are connected to the transfer elements of the respective program relays 2 through 6. In the counter 275 the output pin 8 of one counter is connected to the common input pins 6 and 3 of the succeeding TR-4 counting trigger. The TR-4 half count trigger 274 and the TR-4 first and second carry count triggers 288 and 290 are identical in construction with that of the TR-4 count trigger described above except that pin 5 is directly connected to the minus 100 volt biasing line and pin 4 is directly connected to the minus 100 volt reset line. Because of the direct connection of pins 5 and 4 to the minus 100 volt biasing and reset lines, these triggers cannot be preset and will, in each instance, provide a single output pulse in response to a dual input pulse.

The TR-4 carry trigger 286 and the TR-4 single carry trigger 289 are identical in construction with that of the half count trigger 274 and first and second carry count triggers 288 and 290, except that a single input is utilized. The input is supplied through pin 3 and pin 6 is left unconnected. Because of the single input these latter triggers operate as conventional flip-flop multivibrators and do not uprovide any binary counting function.

*CF-5 carry switch.*—The CF-5 carry switch is preferably a pluggable unit and is a cathode follower unit having a dual input and a single output.

As illustrated in Fig. 29I, the grid 412 of the first half 410 of the tube is connected to input pin 5 through resistors 413 and 414, the latter being bypassed by capacitor 415. The grid 416 of the second half 411 of the tube is connected to input pin 8 through resistors 417 and 418, the latter being bypassed by capacitor 419. The plates of both tubes are connected in common and to pin 9 which is adapted to be connected to a suitable source of D. C. plate potential. The cathode of the first half 410 of the tube is connected through a resistor 422 to pin 6. The cathode of the second half 411 of the tube is connected to output pin 7 through resistor 423. Both the grids are biased through resistors 421 and 420 respectively, connected to output pin 7 which is adapted to be connected to a suitable source of negative D. C. biasing potential. The output is obtained from pin 3 which is connected to pin 4 to the cathodes of both halves of the tube.

The application of a negative input pulse to either of the input pins 4 or 8 results in the appearance of a negative output pulse on pin 3.

*TR-31 carry test trigger.*—The TR-31 carry test trigger is preferably a pluggable unit in the form of a flip-flop multivibrator actuated by an external pulse.

As illustrated in Fig. 29J, the grid 432 of the first half of the tube 430 is connected through resistors 433 and 434, the latter being bypassed by capacitor 435 to the plate 436 of the second half 431 of the dual tube. In a similar manner the grid 437 of the second half 431 of the dual tube is connected through resistors 438 and 439, the latter being bypassed by capacitor 440 to the plate 441 of the first half 430 of the tube. The plate 441 is connected to output pin 9 through plate load resistors 442 and 443. Pin 9 is adapted to be connected to a suitable source of D. C. plate potential. The plate 436 of the second half 431 of the tube is connected to pin 9 through resistors 444 and 445. The grid 432 is biased through resistor 447 connected to pin 5 which is adapted to be connected to a suitable source of negative D. C. biasing potential. The grid 437 is connected to output pin 4 through resistors 438 and 448. Pin 4 is adapted to be connected to the minus 100 volt negative reset line. The grids 432 and 437 are connected together through a capacitor 446. In operation of the unit the first half 430 of the tube is normally cut off with the second half 431 being normally in a conducting condition. The application of a positive pulse to the grid 432 through input pin 6 and resistors 451 and 433 results in an increase in current flow through the first half 430 of the tube. This increase in current flow through the plate load resistors 432 and 433 results in a drop in plate potential, which drop is supplied to the grid 437 through resistors 438 and 439. This decreases conduction of the second half 431 of the tube and the decrease in current flow through plate load resistors 444 and 445 thereof results in raising of the potential of plate 436. This rise in plate potential is supplied to grid 432 through resistors 433 and 434 and results in heavier conduction of the first half 430 of the tube. This conventional multivibrator action in response to an external positive pulse results in the appearance of a full amplitude negative pulse appearing on output pin 7 and a partial amplitude pulse appearing on output pin 8.

*TR-5 multivibrator.*—The TR-5 multivibrator is preferably a pluggable unit and is a conventional externally triggered multivibrator having incorporated therein an RC delay circuit which maintains the unit in flip condition for a predetermined period of time.

As illustrated in Fig. 29K, grid 457 of the first half 455 of the dual tube is connected through resistors 458 and 459, the latter being bypassed by capacitor 460, to the plate of the second half 456 of the dual tube. The grid 461 of the second half 456 of the tube is connected through resistor 462 and capacitor 463 to the plate of the first half 455 of the tube. The plate of the first half 455 of the tube is connected to pin 9 through plate load resistor 464. The plate of the second half 456 of the tube is connected to pin 9 through plate load resistors 465 and 466. Pin 9 is adapted to be connected to a suitable source of positive D. C. potential. The grid 457 of the first half 455 of the tube is biased through resistor 467 connected to pin 5 which is adapted to be connected to a minus 100 volt D. C. biasing potential. The grid 461 is connected through resistor 470 and pin 9 to the plate potential. The grid 461 is also connected to pin 3 through capacitor 468, and to the grid 457 by capacitor 369.

In operation of the unit the second half 456 of the tube is normally conducting, and the first half 455 is in a cut off condition. The application of a negative pulse to the grid 461 through input pin 3, capacitor 468 and resistor 462 results in a cutting off of the second half 456 of the tube and a commencement of conduction in the first half 455 through conventional multivibrator action for a predetermined length of time determined by the time constant of the RC circuit which includes the capacitor 463 and resistor 470. During the period of time while the first half 455 of the tube is conducting, the voltage on the grid 461 will be slowly rising. At a time determined by the time constant of the RC circuit, the potential on the grid 461 will rise to a point where conduction through the second half of tube 456 commences. When conduction commences, the current flow through plate load resistors 465 and 466 will increase and the voltage appearing at output pin 8 will drop. When the second half 456 commences conduction it will, through conventional multivibrator action, serve to sharply cut off the first half 455 of the tube. The TR-5 multivibrator is thus responsive to a negative input pulse appearing on pin 3 and will provide a negative output pulse on pin 8 at a predetermined length of time after application of the above described input pulse.

The principles of the invention have been described and illustrated in a single operative system for the purpose of teaching those skilled in the art how the invention may be performed. Changes in the components, units and assembly will appeal to those skilled in the art, and it is contemplated that such changes may be employed yet falling within the spirit and scope of the claims which are to follow.

Having thus described my invention I claim:

1. Apparatus for automatically adjusting the impression density of typed characters in typewriting devices having mechanical adjustment means for controlling the density of type impression comprising means for measuring the speed of a type bar, means for comparing the measured speed of the type bar with a predetermined speed representative of the desired impression density, and means responsive to said speed comparison means for effecting a selective adjustment of said mechanical adjustment means to bring the speed of said type bar nearer to said predetermined desired speed.

2. Apparatus for automatically adjusting the impression density of typed characters in typewriting devices having mechanical adjustment means for controlling the density of type impression comprising means for measuring the speed of a type bar upon successive actuations thereof, means for comparing the measured speed of the type bar upon each actuation thereof with a predetermined speed representative of the desired impression density, and means responsive to said speed comparison means for effecting selective adjustments of said mechanical adjustment means to bring the speed of said type bar into substantial accord with said predetermined desired speed.

3. Apparatus for automatically adjusting the impression density of typed characters in typewriting devices having mechanical adjustment means for controlling the density of type impression comprising automatically operable means for effecting successive actuation of a type bar, means for measuring the speed of the type bar upon successive actuations thereof, means for comparing the measured speed of the type bar upon each actuation thereof with a predetermined speed representative of the desired impression density, and means responsive to said speed comparison means for effecting selective and successive binary adjustments of said mechanical adjustment means to bring the speed of said type bar into substantial accord with said predetermined desired speed.

4. The apparatus as set forth in claim 3 including automatically operable means for successively displacing said type bar actuation means and selective adjustment means into operative relation with an adjacent unadjusted type bar after completion of an adjustment on an adjusted type bar.

5. The apparatus as set forth in claim 3 including means responsive to a comparison of the speed of an adjusted type bar and said predetermined desired speed for providing an error indication if said measured and predetermined desired speeds do not accord within predetermined limits.

6. Apparatus for automatically adjusting the impression density of typed characters in typewriting devices having mechanical adjustment means for controlling the density of type impression comprising automatically operable means for effecting a predetermined number of successive actuations of a type bar, electrical means for measuring the speed of the type bar upon successive actuations thereof, electrical means for comparing the measured speed of the type bar upon each actuation thereof with a predetermined speed representative of the desired impression density, and means responsive to said speed comparison means for effecting selective adjustments of said mechanical adjustment means to bring the speed of said type bar into substantial accord with said predetermined desired speed.

7. Apparatus as set forth in claim 6 including means responsive to a comparison of the speed of an adjusted type bar and said predetermined speed for providing an error indication if said measured speed and said predetermined desired speed do not accord within predetermined limits.

8. Apparatus for automatically adjusting the impression density of typed characters in typewriting devices having mechanical adjustment means for controlling the density of type impression comprising automatically operable means for effecting successive actuations of a type bar, electrical means for providing electrical signals representative of the speed of the type bar upon each actuation thereof, electronic means responsive to said electrical signals for comparing the measured speed of the type bar upon each actuation thereof with a predetermined speed representative of the desired impression density, and means responsive to said electronic comparison means for automatically effecting selective binary adjustments of said mechanical adjustment means to bring said measured speed into substantial accord with said predetermined speed.

9. Apparatus for automatically adjusting the impression density of type characters in electrically operable typewriting devices having mechanical adjustment means for controlling the density of type impression comprising automatically operable means for effecting a predetermined number of successive actuations thereof, electrical means including a pair of photocells for providing discrete electrical signals representative of the speed of the type bar upon each actuation thereof, electronic counting means responsive to said signals for comparing said measured speed of the type bar upon each actuation thereof with a predetermined speed representative of the desired impression density, and means responsive to said comparison means for effecting selective binary adjustments of said mechanical adjustment means to bring said measured speed into substantial accord with said predetermined speed.

10. Apparatus for automatically adjusting the impression density of typed characters in typewriting devices having individual mechanical adjustment means for controlling the density of impression of each of the type characters printable thereby comprising automatically operable means for effecting a predetermined number of successive actuations of a type bar, a pair of spaced photocells positioned to provide a pair of discrete electrical signals in response to the speed of the passage of the actuated type bar therepast, electronic comparison counting means responsive to said electrical signals and presettable in accordance with a predetermined speed representative of a desired impression density for comparing said measured speed with said predetermined speed and providing an output signal indicative of the direction of the difference therebetween, and means responsive to said output signal for effecting selective binary adjustments of said mechanical adjustment means to bring said measured speed into substantial accord with said predetermined speed.

11. The apparatus as set forth in claim 10 including means responsive to a comparison of the speed of an adjusted type bar and said predetermined desired speed for providing an error indication if said measured speed and said predetermined desired speed do not accord within predetermined limits.

12. The apparatus as set forth in claim 10 including automatically operable means for successively displacing said type bar actuation means and selective adjustment means into operative relation with an adjacent unadjusted type bar after completion of an adjustment on an adjusted type bar.

13. The apparatus as set forth in claim 10 including automatically operable means for returning said type bar actuation means and selective adjustment means to a starting position after the completion of adjustment of all the type bars in a given typewriting device.

References Cited in the file of this patent

UNITED STATES PATENTS

| | | |
|---|---|---|
| 2,472,396 | Schoenbaum | June 7, 1949 |
| 2,501,228 | Light | Mar. 21, 1950 |
| 2,551,306 | Wisman | May 1, 1951 |
| 2,576,529 | McKenney et al. | Nov. 27, 1951 |